United States Patent
Yin

(10) Patent No.: US 12,156,202 B2
(45) Date of Patent: Nov. 26, 2024

(54) SUBSLOT-BASED HARQ-ACK TIMING AND PUCCH RESOURCE DETERMINATION FOR ULTRA-LOW LATENCY PDSCH TRANSMISSION

(71) Applicant: SHARP KABUSHIKI KAISHA, Sakai (JP)

(72) Inventor: Zhanping Yin, Vancouver, WA (US)

(73) Assignee: SHARP KABUSHIKI KAISHA, Osaka (JP)

( * ) Notice: Subject to any disclaimer, the term of this patent is extended or adjusted under 35 U.S.C. 154(b) by 397 days.

(21) Appl. No.: 17/413,129

(22) PCT Filed: Jan. 9, 2020

(86) PCT No.: PCT/JP2020/000506
§ 371 (c)(1),
(2) Date: Jun. 11, 2021

(87) PCT Pub. No.: WO2020/145357
PCT Pub. Date: Jul. 16, 2020

(65) Prior Publication Data
US 2022/0070900 A1    Mar. 3, 2022

Related U.S. Application Data

(60) Provisional application No. 62/790,911, filed on Jan. 10, 2019.

(51) Int. Cl.
*H04W 72/1273*     (2023.01)
*H04L 1/00*     (2006.01)
(Continued)

(52) U.S. Cl.
CPC ....... *H04W 72/1273* (2013.01); *H04L 1/0003* (2013.01); *H04L 1/1812* (2013.01); *H04L 5/0053* (2013.01); *H04W 72/0446* (2013.01)

(58) Field of Classification Search
CPC . H04L 72/1273; H04L 1/1812; H04L 1/1861; H04W 72/0446
See application file for complete search history.

(56) References Cited

U.S. PATENT DOCUMENTS

2015/0264678 A1   9/2015   Yin et al.
2018/0042015 A1   2/2018   Yin et al.
(Continued)

FOREIGN PATENT DOCUMENTS

CN   103582008 A   2/2014
CN   104521304 A   4/2015
(Continued)

OTHER PUBLICATIONS

OPPO, UCI enhancement for URLLC[online], 3GPP TSG RAN WG1 #95 R1-1812816, Nov. 16, 2018.
(Continued)

*Primary Examiner* — Donald L Mills
(74) *Attorney, Agent, or Firm* — ScienBiziP, P.C.

(57) ABSTRACT

A user equipment (UE) is described. The UE includes a higher layer processor configured to determine HARQ-ACK feedback timing for HARQ-ACK feedback of ultra-reliable low-latency communication (URLLC) physical downlink shared channel (PDSCH) transmissions with a subslot structure. The higher layer processor is also configured to determine a physical uplink control channel (PUCCH) resource for the HARQ-ACK feedback. The UE also includes transmitting circuitry configured to transmit the HARQ-ACK feedback for the URLLC PDSCH transmissions based on the HARQ-ACK feedback timing and the PUCCH resource.

13 Claims, 22 Drawing Sheets

(51) Int. Cl.
*H04L 1/1812* (2023.01)
*H04L 5/00* (2006.01)
*H04W 72/0446* (2023.01)

(56) References Cited

U.S. PATENT DOCUMENTS

| | | | |
|---|---|---|---|
| 2018/0323909 A1 | 11/2018 | Ying et al. | |
| 2018/0368137 A1 | 12/2018 | Yin et al. | |
| 2019/0103947 A1* | 4/2019 | Park | H04L 1/1861 |
| 2020/0136763 A1* | 4/2020 | Lee | H04L 1/0031 |
| 2020/0267597 A1* | 8/2020 | Huang | H04W 76/14 |
| 2022/0038242 A1* | 2/2022 | Yoshioka | H04L 5/0055 |
| 2022/0264562 A1* | 8/2022 | Choi | H04W 72/0466 |

FOREIGN PATENT DOCUMENTS

| | | |
|---|---|---|
| CN | 104685816 A | 6/2015 |
| CN | 108781143 A | 11/2018 |
| CN | 108809502 A | 11/2018 |
| CN | 108988984 A | 12/2018 |
| WO | 2018231971 A1 | 12/2018 |
| WO | 2018236117 A1 | 12/2018 |

OTHER PUBLICATIONS

Intel Corporation, Mini-slot length and start time for URLLC[online], 3GPP TSG RAN WG1 adhoc_NR_AH_1701 R1-1700380, Jan. 20, 2017.
CAICT, Enhancements to UCI to support URLLC[online], 3GPP TSG RAN WG1 #95 R1-1813507, Nov. 16, 2018.
Sony, L1 enhancement on UCI for URLLC[online], 3GPP TSG RAN WG1 #95 R1-1812743, Nov. 16, 2018.
Fujitsu, Discussion on HARQ-ACK feedback over PUCCH and PUSCH[online], 3GPP TSG RAN WG1 #95 R1-1812414, Nov. 16, 2018.
Sharp, URLLC HARQ-ACK feedback enhancements[online], 3GPP TSG RAN WG1 #96 R1-1902663, Mar. 1, 2019.
Qualcomm Incorporated: "UCI Enhancements for eURLLC", 3GPP Draft; R1-1813434, TSG-RAN WG1 #95 Nov. 12-16, 2018, Spokane, WA, U.S.A.
Mediatek Inc: "Evaluation and enhancements of NR PUCCH", 3GPP Draft; R1-1812375, TSG-RAN WG1 #95 Nov. 12-16, 2018, Spokane, U.S.A.
Samsung, "Resource Allocation for PUCCH with HARQ-ACK", R1-1710709, 3GPP TSG RAN WG1 NR Ad-Hoc#2, Qingdao, P.R. China Jun. 27-30, 2017 (Jun. 16, 2017), pp. 1-4.
Motorola Mobility, Lenovo: "PUCCH resource allocation for HARQ-ACK feedback to Msg4", R1-1711283, 3GPP TSG RAN WG1 NR Ad-Hoc#2, Qingdao, P. R. China, Jun. 27-30, 2017 (Jun. 30, 2017).
Chenheng Huang: "Review on Physical Layer Key Technology of 3GPP 5G NR", Mobile Communications, Issue 10, Oct. 15, 2018.

* cited by examiner

SUBSLOT-BASED HARQ-ACK TIMING AND PUCCH RESOURCE DETERMINATION FOR ULTRA-LOW LATENCY PDSCH TRANSMISSION

CROSS-REFERENCE TO RELATED APPLICATION(S)

This application is a national stage application of International Patent Application PCT/JP2020/000506, filed Jan. 9, 2020, now published as WO 2020/145357 A1. International Patent Application PCT/JP2020/000506 claims the benefit of U.S. Provisional Patent Application 62/790,911, filed Jan. 10, 2019. U.S. Provisional Patent Application 62/790,911 and International Patent Application PCT/JP2020/000506 are hereby incorporated herein fully by reference for all purposes.

TECHNICAL FIELD

The present disclosure relates generally to communication systems. More specifically, the present disclosure relates to subslot-based hybrid automatic repeat request-acknowledgment (HARQ-ACK) timing and physical uplink control channel (PUCCH) resource determination for ultra-low latency physical downlink shared channel (PDSCH) transmission.

BACKGROUND ART

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

SUMMARY OF INVENTION

In one example, a user equipment (UE), comprising: a higher layer processor configured to determine HARQ-ACK feedback timing for HARQ-ACK feedback of ultra-reliable low-latency communication (URLLC) physical downlink shared channel (PDSCH) transmissions with a subslot structure; the higher layer processor configured to determine a physical uplink control channel (PUCCH) resource for the HARQ-ACK feedback; and transmitting circuitry configured to transmit the HARQ-ACK feedback for the URLLC PDSCH transmissions based on the HARQ-ACK feedback timing and the PUCCH resource.

In one example, a base station (e.g., a gNB), comprising: a higher layer processor configured to determine HARQ-ACK feedback timing for HARQ-ACK feedback of ultra-reliable low-latency communication (URLLC) physical downlink shared channel (PDSCH) transmissions with a subslot structure; the higher layer processor configured to determine a physical uplink control channel (PUCCH) resource for the HARQ-ACK feedback; and receiving circuitry configured to receive the HARQ-ACK feedback for the URLLC PDSCH transmissions based on the HARQ-ACK feedback timing and the PUCCH resource.

In one example, a method by a user equipment (UE), comprising: determining HARQ-ACK feedback timing for HARQ-ACK feedback of ultra-reliable low-latency communication (URLLC) physical downlink shared channel (PDSCH) transmissions with a subslot structure; determining a physical uplink control channel (PUCCH) resource for the HARQ-ACK feedback; and transmitting the HARQ-ACK feedback for the URLLC PDSCH transmissions based on the HARQ-ACK feedback timing and the PUCCH resource.

In one example, a method by a base station (e.g., a gNB), comprising: determining HARQ-ACK feedback timing for HARQ-ACK feedback of ultra-reliable low-latency communication (URLLC) physical downlink shared channel (PDSCH) transmissions with a subslot structure; determining a physical uplink control channel (PUCCH) resource for the HARQ-ACK feedback; and receiving the HARQ-ACK feedback for the URLLC PDSCH transmissions based on the HARQ-ACK feedback timing and the PUCCH resource.

DESCRIPTION OF EMBODIMENTS

Figure 1:
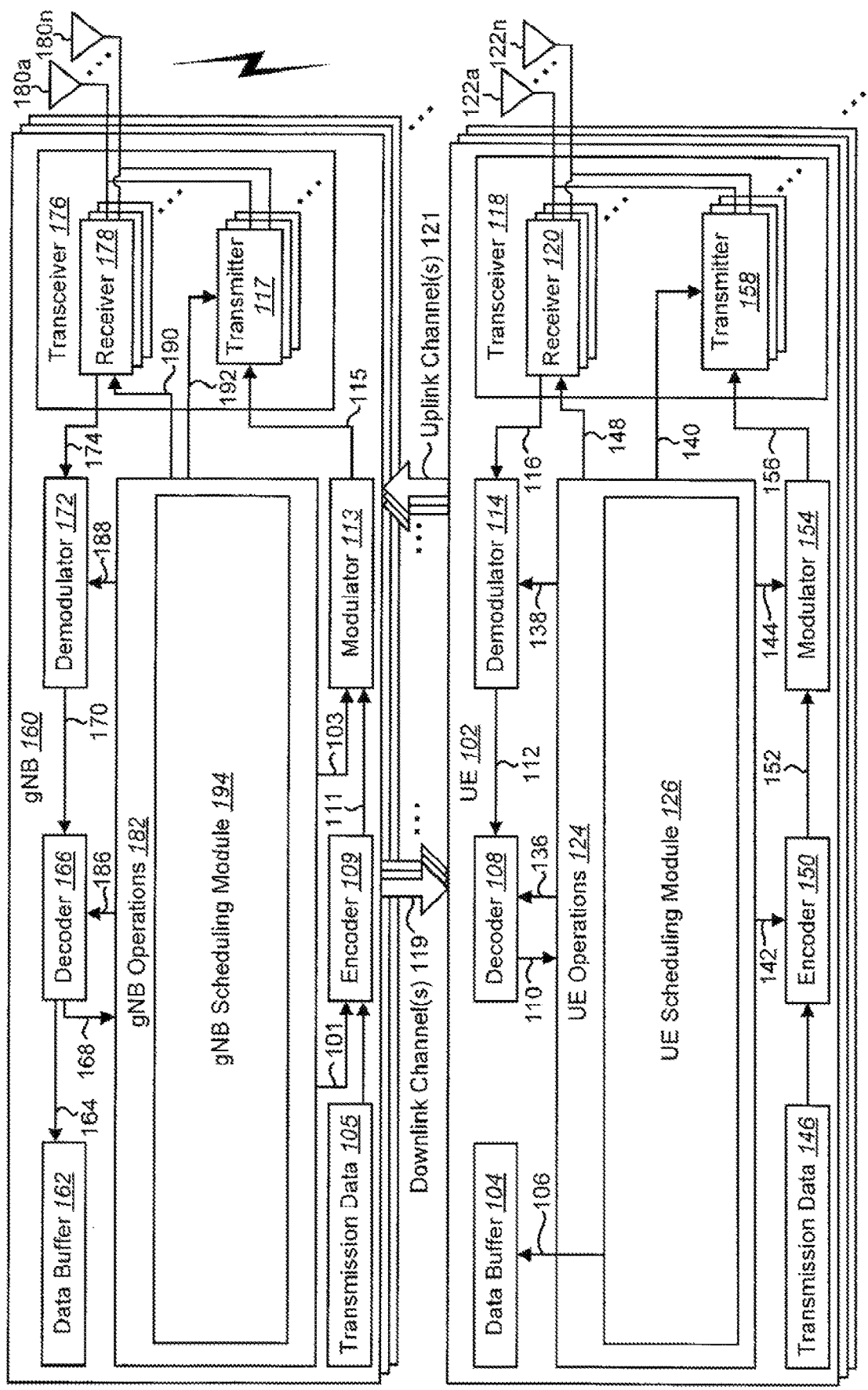
FIG. 1 is a block diagram illustrating one implementation of one or more base stations (e.g., one or more gNBs) and one or more user equipments (UEs) in which systems and methods for HARQ-ACK timing and physical uplink control channel (PUCCH) resource determination for ultra-low latency physical downlink shared channel (PDSCH) transmission may be implemented.

A user equipment (UE) is described. The UE includes a higher layer processor configured to determine HARQ-ACK feedback timing for HARQ-ACK feedback of ultra-reliable low-latency communication (URLLC) physical downlink shared channel (PDSCH) transmissions with a subslot structure. The higher layer processor is also configured to determine a physical uplink control channel (PUCCH) resource for the HARQ-ACK feedback. The UE also includes transmitting circuitry configured to transmit the HARQ-ACK feedback for the URLLC PDSCH transmissions based on the HARQ-ACK feedback timing and the PUCCH resource.

The HARQ-ACK feedback timing may be based on an explicit timing indication with a re-interpretation of a PDSCH-to-HARQ-timing indicator. The PDSCH-to-HARQ-timing indicator may indicate a number of subslots after the PDSCH transmission for the HARQ-ACK feedback. A subslot duration and structure may be determined by an uplink subslot duration for a PUCCH resources configuration. A subslot duration may be determined based on a duration of a corresponding PDSCH transmission.

The HARQ-ACK feedback timing may be determined based on a pre-defined or configured HARQ-ACK timing table. Timing in the HARQ-ACK timing table may correspond to modulation and coding scheme (MCS) settings or transport block (TB) sizes. Timing in the HARQ-ACK timing table may be determined by a number of symbols in a PDSCH transmission or a PDSCH duration. Timing in the HARQ-ACK timing table may be determined based on a UE capability.

A base station (e.g., a gNB) is also described. The gNB includes a higher layer processor configured to determine HARQ-ACK feedback timing for HARQ-ACK feedback of URLLC PDSCH transmissions with a subslot structure. The higher layer processor is also configured to determine a PUCCH resource for the HARQ-ACK feedback. The gNB also includes receiving circuitry configured to receive the HARQ-ACK feedback for the URLLC PDSCH transmissions based on the HARQ-ACK feedback timing and the PUCCH resource.

A method by a UE is also described. The method includes determining HARQ-ACK feedback timing for HARQ-ACK feedback of URLLC PDSCH transmissions with a subslot structure. The method also includes determining a PUCCH resource for the HARQ-ACK feedback. The method further includes transmitting the HARQ-ACK feedback for the URLLC PDSCH transmissions based on the HARQ-ACK feedback timing and the PUCCH resource.

A method by a gNB is also described. The method includes determining HARQ-ACK feedback timing for HARQ-ACK feedback of URLLC PDSCH transmissions with a subslot structure. The method also includes determining a PUCCH resource for the HARQ-ACK feedback. The method further includes receiving the HARQ-ACK feedback for the URLLC PDSCH transmissions based on the HARQ-ACK feedback timing and the PUCCH resource.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NR" by 3GPP) envisions the use of time/frequency/space resources to allow for enhanced mobile broadband (eMBB) communication and ultra-reliable low-latency communication (URLLC) services, as well as massive machine type communication (MMTC) like services. A new radio (NR) base station may be referred to as a gNB. A gNB may also be more generally referred to as a base station device.

In 5G NR, different services can be supported with different quality of service (QOS) requirements (e.g., reliability and delay tolerance). For example, eMBB may be targeted for high data rate, and URLLC is for ultra-reliability and low latency. To support ultra-low latency, more than one HARQ-ACK feedback in a slot may be configured for URLLC services. One potential method is to configure a subslot structure in a slot, and the PUCCH resources can be allocated based on a subslot. Multiple PUCCH resources for URLLC PDSCH HARQ-ACK feedback may be supported in a slot by extending the PUCCH resource configuration to subslot level from slot level in NR release 15.

On the other hand, the HARQ-ACK feedback timing for a URLLC PDSCH may also need to be specified. In this disclosure, we present methods to indicate the HARQ-ACK feedback timing and to determine the PUCCH resource for URLLC PDSCH transmissions with a subslot structure.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for HARQ-ACK timing and physical uplink control channel (PUCCH) resource determination for ultra-low latency physical downlink shared channel (PDSCH) transmission may be implemented. The one or more UEs 102 communicate with one or more gNBs 160 using one or more antennas 122$a$-$n$. For example, a UE 102 transmits electromagnetic signals to the gNB 160 and receives electromagnetic signals from the gNB 160 using the one or more antennas 122$a$-$n$. The gNB 160 communicates with the UE 102 using one or more antennas 180$a$-$n$.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), MAC PDU, and/or UL-SCH (Uplink-Shared Channel)).

Here, UL data may include URLLC data. The URLLC data may be UL-SCH data. Here, URLLC-PUSCH (i.e., a different Physical Uplink Shared Channel from PUSCH) may be defined for transmitting the URLLC data. For the sake of simple description, the term "PUSCH" may mean any of (1) only PUSCH (e.g., regular PUSCH, non-URLLC-PUSCH, etc.), (2) PUSCH or URLLC-PUSCH, (3) PUSCH and URLLC-PUSCH, or (4) only URLLC-PUSCH (e.g., not regular PUSCH).

Also, for example, uplink channels 121 may be used for transmitting a Hybrid Automatic Repeat Request-ACK (HARQ-ACK), Channel State Information (CSI), and/or a Scheduling Request (SR). The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. Namely, the SR may be used for requesting UL resources for transmitting UL data.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122$a$-$n$. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include a UE scheduling module 126.

The UE scheduling module 126 may perform PUCCH configuration and resource allocation as described herein. Due to low latency requirements of URLLC, two or more PUCCH resources may need to be configured in a single slot. The current time domain allocation for short PUCCH by configuring a single starting symbol in a slot will not be sufficient.

To configure more than one PUCCH instance in a slot, the UE 102 may be configured with a subslot structure for HARQ-ACK PUCCH resource allocation. Different subslot structures can be specified, including at least a 2-symbol structure, a 3 and 4 symbol structure and/or a 7-symbol structure.

The UE 102 may be configured with higher layer signaling for a subslot structure for PUCCH allocation. One or more PUCCH resources may be configured within a configured subslot.

In an approach, the UE 102 may be configured with a subset of subslots in a subslot structure, and PUCCH is configured only within the subslots in the subset of the subslot structure. In another approach, the UE 102 may be configured with multiple subsets of subslots in the subslot structure for PUCCH resource allocation.

The subsets of subslots in a subslot structure may be specified and the UE 102 may be configured by higher layer signaling on the subset of subslots in a subslot structure. The UE 102 may be configured with multiple subslot structures for PUCCH resource allocation.

Depending on the PUCCH resources configuration, several methods may be implemented to determine the HARQ-ACK feedback timing and the PUCCH resource for HARQ-ACK reporting of URLLC PDSCH transmissions. With a subslot structure, for HARQ-ACK timing, at least two methods are described herein. In a first method (Method 1), HARQ-ACK timing is explicitly indicated in DCI, by the PDSCH-to-HARQ-timing indicator field. Instead of indicating the number of slots, the PDSCH-to-HARQ-timing indicator may be used to indicate the number of subslots after the PDSCH transmission.

The subslot duration and structure may be determined by the uplink subslot duration for PUCCH resources configuration. The subslot duration may be determined based on the duration of the corresponding PDSCH transmission.

In a second method (Method 2), HARQ-ACK timing is determined based on a pre-defined or configured processing timing table. The timing table may be configured to a UE 102 by radio resource control (RRC) signaling. The timing in the table may correspond to Modulation and Coding Scheme (MCS) settings or payload/TB sizes. The timing in the table may be determined by the number of symbols in a PDSCH transmission or the PDSCH duration. The timing in the table may be determined by a UE capability. The PDSCH-to-HARQ-timing-indicator field may be ignored or removed from the PDSCH scheduling DCI format for URLLC data.

Regardless of which method is used to determine the HARQ-ACK timing, the actual PUCCH resource to be used for HARQ-ACK reporting is closely related to the HARQ-ACK resource configuration. In one case, PUCCH resources may be available in all subslots following a configured subslot structure. In another case, PUCCH resources may be available in a subset of subslots following a higher layer signaling.

In the case of subslot PUCCH allocations, the UE 102 may determine the HARQ-ACK timing explicitly based on PDSCH-to-HARQ-timing indicator or implicitly based on UE capability or pre-defined/configured table. The UE 102 may then choose the earliest PUCCH resource that satisfied the HARQ-ACK timing to report the HARQ-ACK feedback. These methods to determine the HARQ-ACK feedback timing and the PUCCH resource for HARQ-ACK reporting of URLLC PDSCH transmissions are described in more detail below.

A URLLC HARQ-ACK PUCCH resource in a slot or a subslot may be specified as an enhanced PUCCH format to provide desired reliability requirements. To provide high reliability and low latency, some enhancements to PUCCH formats are described. Transmit diversity (TxD) and enhanced power control for all PUCCH formats are described. More than one Physical Resource Block (PRB) allocation for PUCCH format 0, 1, and 4 may be implemented. More PRB allocation and lower maximum code rate by the maxCodeRate parameter for enhanced PUCCH formats for URLLC are also described herein.

In the case that a subslot structure is configured, for a PUCCH resource configuration in a subslot, the starting symbol index in a PUCCH configuration may be modified to represent the relative position within a subslot instead of the symbol index within a slot. The startingSymbolIndex field may be removed or ignored if a PUCCH always starts from the beginning of a subslot or ends at the last symbol of a subslot. Whether a PUCCH always starts from the beginning of a subslot or ends at the last symbol of a subslot may be specified in the standard or may be configured by higher layer signaling to a UE 102.

One or more PUCCH resource sets may be configured in each subslot of a configured subslot structure. The same PUCCH configurations on the PUCCH formats and resources sets may be used in all subslots. In the case of different subslot durations, the PUCCH formats and resource sets may be determined based on the subslots with a shorter duration.

The UE 102 may be configured with a subset of subslots in a subslot structure. One or more PUCCH resource sets may be configured only within the subslots in the subset of the subslot structure.

The UE 102 may be configured with multiple subsets of subslots in the subslot structure for PUCCH resource allocation. The PUCCH resources may be configured independently in each subset of subslots. Thus, different PUCCH configurations may be applied to different sets of subslots.

The UE 102 may be configured with multiple subslot structures for PUCCH resource allocation. The PUCCH resources may be configured independently in each subslot structure, and different PUCCH resource configurations may be applied to different subslot structures.

In the case of a slot-based PUCCH resource, multiple starting symbol locations in a slot may be specified for the enhanced PUCCH formats for URLLC.

The PUCCH resources in a slot should not overlap with each other in time domain. Each PUCCH resource should be contained within the slot, and not cross a slot boundary. Therefore, the number of PUCCH resources that can be configured in a slot depends on the number of symbols in the configured PUCCH format.

Aspects of PUCCH formats in NR are described herein. PUCCH may be used to report important uplink control information (UCI), which includes HARQ-ACK, SR, channel state information (CSI), etc. While NR release-15 is designed mainly for enhanced mobile broadband (eMBB), several physical uplink control channel (PUCCH) formats are specified for different number of bits, as given below.

As used herein, u represents subcarrier spacing configuration, where $\Delta f=2^\mu \cdot 15$ [KHz]·$N_{slot}^{subframe,\mu}$ represents the number of slots per subframe for subcarrier spacing configuration $\mu \cdot N_{slot}^{frame,\mu}$ represents the number of slots per frame for subcarrier spacing configuration $\mu \cdot N_{symb}^{slot}$ represents the number of symbols per slot.

Multiple orthogonal frequency division multiplexing (OFDM) numerologies are supported as given by Table 1 where μ and the cyclic prefix for a bandwidth part may be obtained from the higher-layer parameter subcarrierSpacing and cyclicPrefix, respectively.

TABLE 1

| μ | $\Delta f = 2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For subcarrier spacing configuration μ, slots are numbered $n_s^\mu \in \{0, \ldots, N_{slot}^{subframe,\mu}-1\}$ in increasing order within a subframe and $n_{s,f}^\mu \in \{0, \ldots, N_{slot}^{frame,\mu}-1\}$ in increasing order within a frame. There are $N_{symb}^{slot}$ consecutive symbols (e.g., OFDM symbols) in a slot where $N_{symb}^{slot}$ depends on the cyclic prefix as given by Table 2 and Table 3. The start of slot $n_s^\mu$ in a subframe is aligned in time with the start of symbol $n_s^\mu N_{symb}^{slot}$ in the same subframe. Table 2 includes the number of OFDM symbols per slot, slots per frame, and slots per subframe for normal cyclic prefix. Table 3 includes the number of OFDM symbols per slot, slots per frame, and slots per subframe for extended cyclic prefix.

TABLE 2

| μ | $N_{symb}^{slot}$ | $N_{slot}^{frame,\mu}$ | $N_{slot}^{subframe,\mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame,\mu}$ | $N_{slot}^{subframe,\mu}$ |
| --- | --- | --- | --- |
| 2 | 12 | 40 | 4 |

The physical uplink control channel supports multiple formats as shown in Table 4. In case frequency hopping is configured for PUCCH format 1, 3, or 4, the number of symbols in the first hop is given by $\lfloor N_{symb}^{PUCCH}/2 \rfloor$ where $N_{symb}^{PUCCH}$ is the length of the PUCCH transmission in OFDM symbols.

TABLE 4

| PUCCH format | Length in OFDM symbols $N_{symb}^{PUCCH}$ | Number of bits |
| --- | --- | --- |
| 0 | 1-2 | ≤2 |
| 1 | 4-14 | ≤2 |
| 2 | 1-2 | >2 |
| 3 | 4-14 | >2 |
| 4 | 4-14 | >2 |

The UE 102 may be configured with a separate PUCCH resource set for enhanced PUCCH formats from the "normal" PUCCH format (i.e., the PUCCH resource sets for URLLC traffic may be configured independently and separately from eMBB PUCCH resource sets). The PUCCH resource for URLLC may be configured with different parameters and/or with some different fields from that of eMBB resources.

In NR, multiple PUCCH resource sets may be configured for different payload sizes. In each PUCCH resource set, up to 16 PUCCH resources can be configured. If the number of resources is more than 4, subsets are formed. In NR, for a PUCCH reporting, the PUCCH resource set may first be determined based on the UCI payload size. The ARI field may indicate the PUCCH resource subset in a PUCCH resource set. If there are more than 1 PUCCH resource in each subset, the PUCCH resource for UCI reporting may be determined implicitly based on CCE index of the scheduling DCI. Namely, the PUCCH resource subset(s) for URLLC or eMBB may be indicated by using the ARI field. Also, the PUCCH resource(s) for URLLC or eMBB may be determined based on CCE index of the scheduling DCI (e.g., the CCE index of PDCCH scheduling PDSCH transmission).

URLLC traffic requires ultra-reliability and low latency. The HARQ-ACK for URLLC packet may be supported to provide the required reliability. Furthermore, the HARQ-ACK feedback should be reported immediately after a URLLC transmission.

To provide desired reliability for DL URLLC transmission, PUCCH resources need to be allocated to allow PDSCH retransmissions. Due to high reliability and low latency requirements, to support re-transmission of URLLC PDSCH, one or more HARQ-ACK feedback needs to be reported within a subframe, and more than one HARQ-ACK reporting PUCCH resources may need to be configured in a subframe or a slot.

The current time domain allocation for a PUCCH resource by configuring a starting symbol and a duration may not be sufficient. In an approach, the UE 102 may be configured with a subslot structure, and the PUCCH resources are configured within a subslot structure.

To reduce latency, in LTE, a shortened transmission time interval (sTTI) can be configured besides legacy 1 ms TTI. The sTTI can be configured at the subslot level with 2 or 3 symbols in a sTTI, or at the slot level with 7 symbols in a sTTI. In LTE, the DL and UL shortened TTI duration can be configured separately, and the DL sTTI duration has to be the same or shorter than the UL sTTI duration. Once configured, the sPDSCH, sPUCCH and sPUSCH transmissions all follow the configured sTTI structure.

In NR Rel-15, the PUCCH resources may be configured at a slot level of 14 symbols. Therefore, to have more than one HARQ-ACK feedback in a slot, the granularity of PUCCH reporting should be enhanced. Thus, in this disclosure, the PUCCH allocation methods based on a mini-slot or subslot structure are described.

DL and UL subslot configuration are described herein. In NR, subslot configuration for PUCCH for HARQ-ACK reporting can be separately configured from PDSCH and PUSCH scheduling. If a DL subslot structure is configured for PDSCH scheduling, the UE 102 can limit the starting symbols for PDCCH or DCI monitoring in each slot. This can reduce complexity.

In some approaches, the DL and UL subslot structure can be the same. In other approaches, the DL and UL subslot structure can be different. Unlike LTE sTTI, the PUCCH duration can be shorter than a URLLC PDSCH duration.

Furthermore, in NR, the starting symbol and duration can be scheduled for a PDSCH and PUSCH. Thus, NR does not need to follow a subslot structure for PDSCH and PUSCH scheduling. Therefore, NR only needs to define subslot structure for PUCCH of HARQ-ACK reporting.

As described herein, the focus is on UL subslot configuration for HARQ-ACK feedback on PUCCH for case of explanation. However, the subslot allocation may also be applied on the DL for PDSCH transmissions, and on UL for PUSCH transmissions.

A subslot structure for HARQ-ACK PUCCH configuration in URLLC is described herein. A slot may be partitioned into multiple subslots, and the PUCCH resources for HARQ-ACK may be configured within each subslot. Therefore, the PUCCH resource configuration for URLLC includes a subslot structure and PUCCH resource allocation within a subslot.

There is a tradeoff between the duration of a subslot and the number of PUCCH instances in a slot. A shorter duration may provide more opportunities for HARQ-ACK reporting with reduced latency. But the shorter duration may also bring more overhead on the PUCCH resources. To provide retransmission with desired latency, within 1 ms, 2 to 4 HARQ-ACK reporting instances are enough.

The minimum subslot may be only one symbol. In this case, all symbols can be used to carry HARQ-ACK. However, with a subslot structure, a PUCCH resource should not cross the subslot boundary. Thus, a 1 symbol short PUCCH can be used. To allocate multiple symbols in a subslot, PUCCH resources can be configured with more robustness and flexibility.

Figure 2:
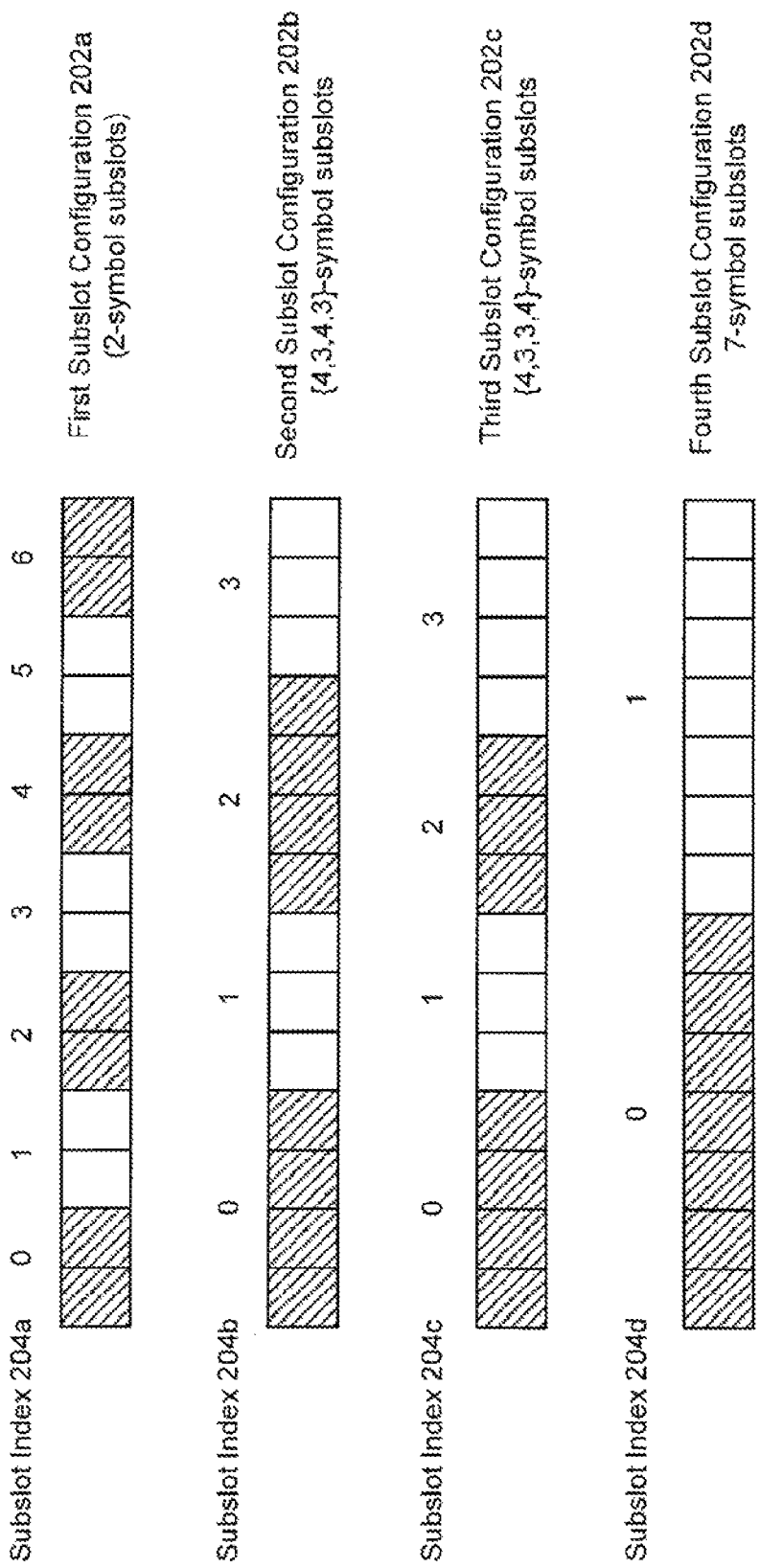
FIG. 2 illustrates examples of subslot structure for URLLC PUCCH allocation.

Different subslot configurations may be specified for NR. FIG. 2 illustrates different subslot structures for URLLC PUCCH allocation.

In one case, the PUCCH resources can be configured in each subslot of a configured subslot structure. Multiple sets of PUCCH resources can be configured in each subslot. Each PUCCH resource set may be configured for a payload range. Each resource set may contain PUCCH resources with the same or different formats, with the same or different starting positions in a subslot. A single PUCCH resource should not cross over a subslot boundary.

Figure 3:
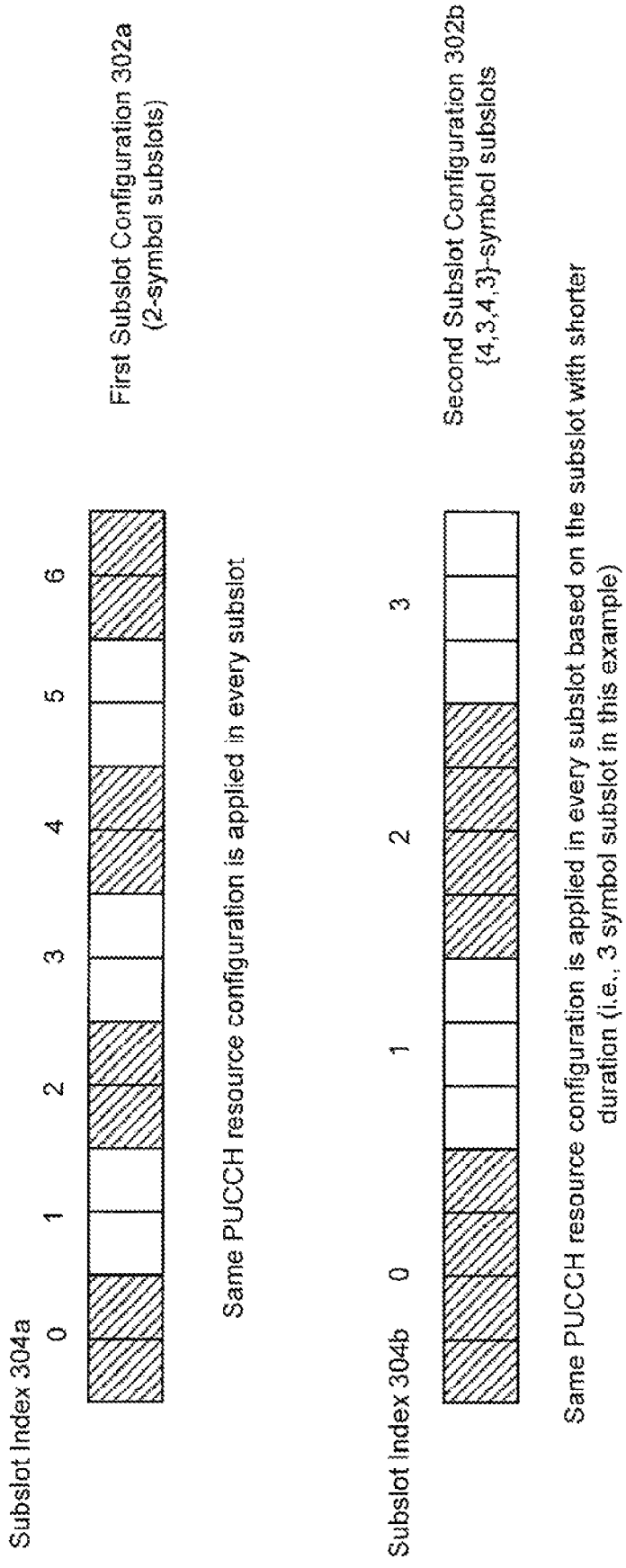
FIG. 3 illustrates examples of PUCCH resource configuration in each subslot of FIG. 2.

The same PUCCH configuration can be applied to all subslots, as shown in FIG. 3. In the case of the different duration for the subslots (e.g., in the case of 3 and 4 symbol subslot structure), the same PUCCH configuration may be determined based on the subslot with a shorter duration.

In another case, the PUCCH resources may be configured in a subset of the subslots. The subset pattern and indexes may be configured by higher layer signaling. This reduces the PUCCH resource overhead by limiting the PUCCH resources in a subset of subslots.

Figure 4:
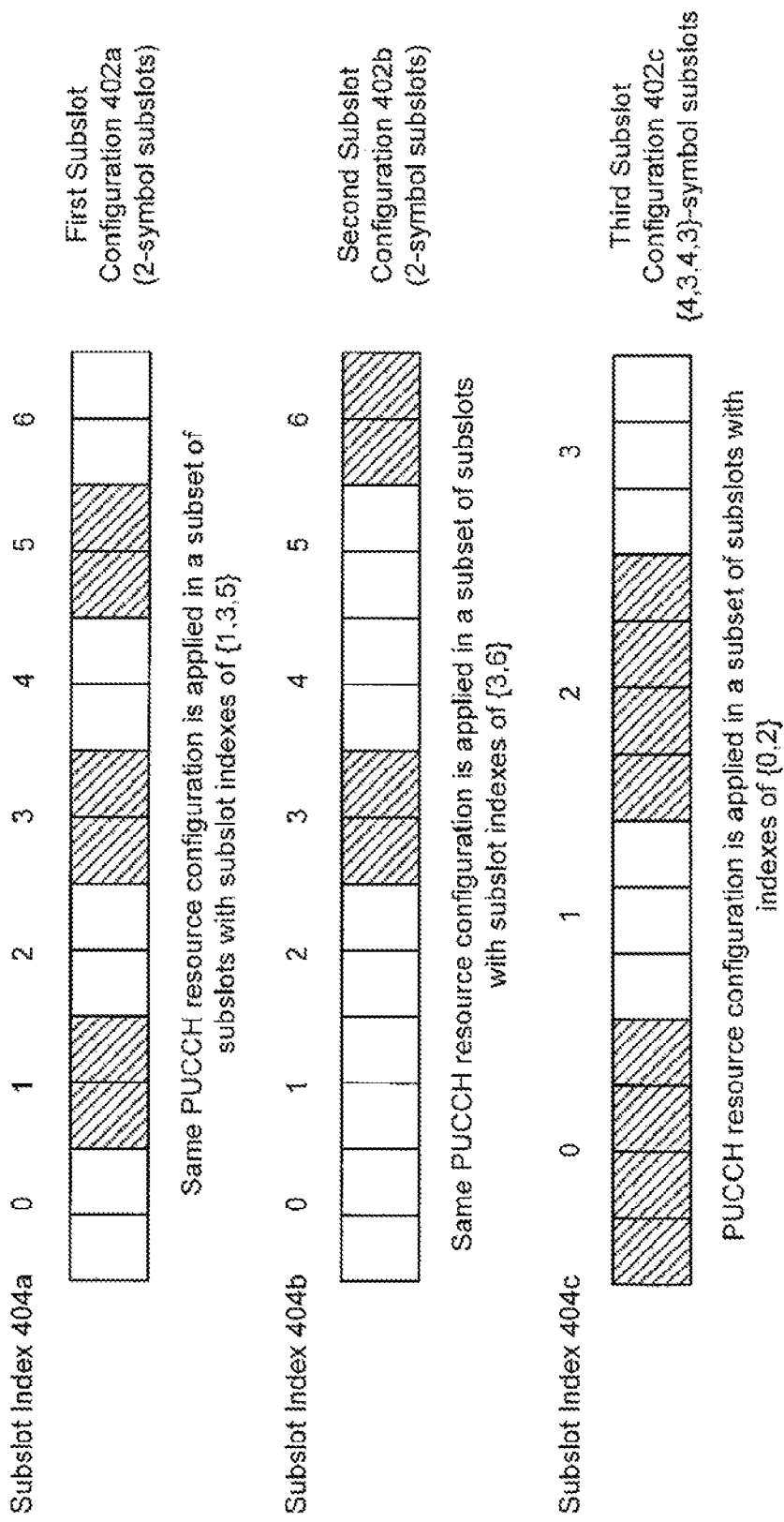
FIG. 4 illustrates examples of PUCCH allocation in a subset of subslots of FIG. 2.

The subslot indexes included in the subset may be configured by higher layer signaling. The subslot indexes in the subset may be defined by a table that includes the allowed sets of subslot indexes. And the index in the table is signaled to UE 102 by higher layer signaling. FIG. 4 shows some examples of PUCCH allocation in a subset of subslots.

Figure 5:
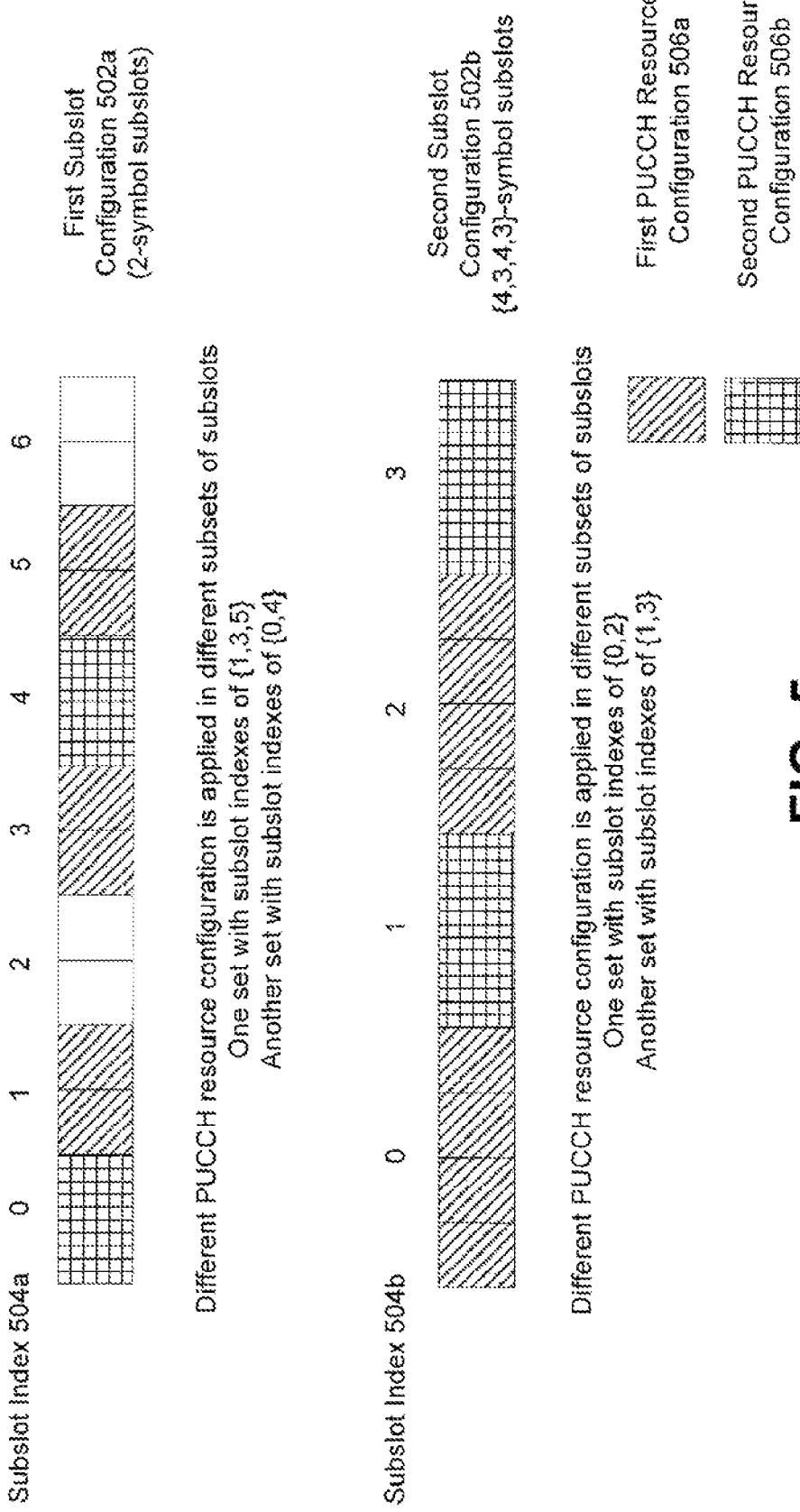
FIG. 5 illustrates examples of PUCCH configuration in multiple subsets of subslots.

In yet another case, multiple subsets of subslots may be configured, and PUCCH configuration may be configured independently in each subset of subslots. FIG. 5 shows several examples of PUCCH configuration in multiple subset of subslots. In the example of 3 and 4 symbol subslots in FIG. 5, different subsets can be formed for subslots with different durations, and the same or different PUCCH resource configurations can be used in the different subsets with different durations.

In another case, the UE 102 may be configured with multiple subslot structures. Different PUCCH resource sets can be configured that follow different subslot structure configurations.

Low latency physical uplink control channel (PUCCH) enhancements and resource configuration are also described herein. In a first aspect, PUCCH enhancements for ultra-reliability and low latency are described. Some enhancements are needed to satisfy the URLLC PUCCH reliability requirements (e.g., achieving a BER of $10^{-6}$ instead of $10^{-2}$ for regular HARQ-ACK).

For a single PUCCH resource within a slot or subslot, several methods can be implemented. A first method may include transmit power control. One way to increase reliability is to increase the transmit power of PUCCH for URLLC HARQ-ACK feedback. Enhanced PUCCH formats for URLLC may be configured with a higher transmit power than normal PUCCH formats. For example, a separate amplitude scaling factor BPUCCH may be configured and mapped in sequence transmitted on the enhanced PUCCH formats.

A second method may include transmit diversity. For all PUCCH formats 0/1/2/3/4 enhancement, transmit diversity with multiple antenna transmission on multiple PUCCH resources may be configured to enhance the PUCCH performance. Transmit diversity (TxD) can also increase the reliability. With TxD, the PUCCH signal is transmitted on two antenna ports, each using a separate PUCCH Physical Resource Block (PRB) resource.

For HARQ-ACK transmission with sequence based PUCCH format 0, the spatial orthogonal resource transmit diversity (SORTD) scheme may be supported for transmissions with two antenna ports ($p \in [p0, p1]$).

The UE 102 may use a PUCCH resource for transmission of HARQ-ACK in a slot mapped to antenna port p. For transmission on antenna port p0, the UE 102 may use a PUCCH resource that is configured or implicitly derived based on CCE indexes of the scheduling DCI. For transmission on antenna port p1, the UE 102 may use the next PUCCH resource after the PUCCH resource used for antenna port p0.

The TxD may be configured to a UE 102 by RRC configurations in PUCCH configuration, or a separate information element.

A third method may include more frequency domain allocation. For short PUCCH format 0, 1, and 4, only one PRB is allocated in NR Rel-15. For URLLC PUCCH, more than 1 PRB may be allocated for enhanced PUCCH format 0, 1, and 4. For long PUCCH formats 2 and 3, more PRBs may be configured compared with a PUCCH for eMBB HARQ-ACK feedback with the same payload range.

Furthermore, the long PUCCH duration may be limited for URLLC PUCCH configuration. In one case, only PUCCH duration of 4 and 7 are supported. In another case, PUCCH duration of 4 to 7 may be supported. The actual allowed PUCCH duration may be determined based on the numerology, the number of PUCCHs for URLLC PDSCH HARQ-ACK feedback in a slot, and/or determined by the subslot duration if a subslot structure is configured and applied for PUCCH resource allocation.

A fourth method may include a lower maximum code rate for PUCCH of URLLC HARQ-ACK feedback. To increase the reliability of PUCCH HARQ-ACK feedback, the maxCodeRate (i.e., the PUCCH-MaxCodeRate parameter for the maximum code rate for UCI on the PUCCH) may be configured with a much lower rate compared with PUCCH resources configured for HARQ-ACK feedback of eMBB PDSCH transmissions. The maxCodeRate may be configured jointly considering more PRB allocations above. In other words, the enhanced PUCCH formats for URLLC may be configured with a lower maxCodeRate compared with PUCCH resources for eMBB. Thus, for the same payload range, the number of PRBs for URLLC PUCCH may be higher than that of an eMBB PUCCH resource.

In a second aspect, PUCCH resource configuration within a slot or subslot is described herein. With at least one of the above-mentioned enhancements on a PUCCH format, the enhanced PUCCH format can be configured for HARQ-ACK feedback of URLLC PDSCH transmissions. The enhanced PUCCH format can be PUCCH format 0/1/2/3/4. The payload size and duration restrictions may be different from the PUCCH formats for eMBB HARQ-ACK feedback. Since URLLC supports more than one HARQ-ACK feedback in a slot, enhancements on PUCCH format configuration must be specified.

For subslot level configuration, if a subslot structure is configured for PUCCH resource allocation, the starting symbol index may be re-interpreted as the relative index within a subslot instead of the symbol index of a slot. As shown below in Listing 1, the enhanced PUCCH format is noted as PUCCH_format0_e, PUCCH_format1_e, PUCCH_format2_e, PUCCH_format3_e, PUCCH_format4_e, respectively, to show the enhancement over existing PUCCH formats. Other names over existing formats and new PUCCH formats may be defined as well.

Whether a PUCCH format can be supported or not may depend on the duration of a given subslot.

For enhanced PUCCH format 0 and enhanced PUCCH format 2, the startingSymbolIndex may be from the beginning of a subslot to the indexes of subslotduration-1 depending on the number of symbols in the subslot. For a given PUCCH duration of nrofSymbols, the startingSymbolIndex may range from 0 to (subslotduration−nrofSymbols).

For enhanced PUCCH format 1, 3, and 4, the startingSymbolIndex may be from the beginning of a subslot to the indexes of subslotduration-4 depending on the number of symbols in the subslot. For a given PUCCH duration of nrofSymbols, the startingSymbolIndex may range from 0 to (subslotduration−nrofSymbols).

Furthermore, for enhanced PUCCH format 0, 1, and 4, the number of PRBs may be configured with one or multiple PRBs instead of a fixed one PRB allocation.

| Listing 1 |
| --- |

```
PUCCH-format0_e ::=        SEQUENCE {
   initialCyclicShift         INTEGER (0..11),
   nrofSymbols                INTEGER (1..2) ,
   startingSymbolIndex        INTEGER (0..subslotduration-1)
   nrofPRBs                   INTEGER (1..16) ,
}
PUCCH-format1_e ::=        SEQUENCE {
   initialCyclicShift         INTEGER (0..11),
   nrofSymbols                INTEGER (4..14) ,
   startingSymbolIndex        INTEGER ( 0..subslotduration-4)
   timeDomainOCC              INTEGER (0..6)
   nrofPRBS                   INTEGER (1..16) ,
}
PUCCH-format2_e ::=        SEQUENCE {
   nrof PRBs                  INTEGER (1..16) ,
   nrofSymbols                INTEGER (1..2),
   startingSymbolIndex        INTEGER (0..subslotduration-1)
}
PUCCH-format3 e ::=        SEQUENCE {
   nrofPRBs                   INTEGER (1..16) ,
   nrofSymbols                INTEGER (4..14),
   startingSymbolIndex        INTEGER (0..subslotduration-4)
}
PUCCH-format4 e ::=        SEQUENCE {
   nrofPRBS                   INTEGER (1..16) ,
   nrofSymbols                INTEGER (4..14),
   occ-Length                 ENUMERATED {n2, n4},
   occ-Index                  ENUMERATED {n0, n1, n2, n3},
   startingSymbolIndex        INTEGER ( 0..subslotduration-4)
}
```

In the case of subslot PUCCH resource allocation, the Rel-15 slot level PUCCH configuration may be extended to subslot level. The enhanced PUCCH formats may be used in subslot PUCCH configuration.

Depending on the subslot duration, some parameters may be further restricted to the valid ranges. For a subslot duration of 2 symbols, only short PUCCH format 0 and 2 can be configured. For a subslot duration of 3 symbols in a 3 and 4 symbol subslot structure, only short PUCCH format 0 and 2 can be configured.

For a subslot duration of 4 symbols in a 3 and 4 symbol subslot structure, short PUCCH format 0 and 2 can be configured. Long PUCCH format 1,3,4 with 4 symbols only can be configured. For long PUCCH format 1 and 4, more than one PRB may be allocated for URLLC PUCCH for HARQ-ACK reporting.

For a subslot duration of 7 symbols, short PUCCH format 0 and 2 can be configured. Long PUCCH format 1,3,4 with 4-7 symbols can be configured provided all symbols of the PUCCH are confined in the 7-symbol subslot.

In a subslot with PUCCH allocation, multiple sets of PUCCH resources can be configured. Each resource set may be defined by a payload range. Each resource set may contain PUCCH resources with the same or different formats, with the same or different starting positions in a subslot. A single PUCCH resource may not cross over a subslot boundary.

In one method, each PUCCH resource may be defined by a PUCCH format with at least the number of symbols, the number of PRBs, the starting PRB index, and the starting symbol index relative to the starting symbol of the subslot.

In another method, a PUCCH resource always starts from the beginning of a subslot to give fast feedback. Thus, the startingSymbolIndex field in the PUCCH format configurations may be ignored or removed. Only the number of symbols and the number of PRBs, etc. may be configured.

In yet another method, a PUCCH resource may always end at last symbol of a subslot. Thus, the startingSymbolIndex field in the PUCCH format configurations may also be ignored or removed. Only the number of symbols and the number of PRBs, etc., are configured.

Whether the PUCCH starts from the beginning of a subslot or ends at last symbol of a subslot may be specified by the standard, or configured by higher layer signaling to the UE 102 from a gNB 160. In one case, the PUCCH resources can be configured in each subslot of a configured subslot structure. The same configuration can be applied to all subslots. In the case of a different duration for the subslots (e.g., in a 3 and 4 symbol subslot structure), the same PUCCH configuration may be determined based on the subslot with shorter duration. In the case that a PUCCH resource always starts from the beginning of a subslot, the last symbol of a 4-symbol subslot is not used for PUCCH. In the case that a PUCCH resource always ends at the last symbol of a subslot, the first symbol of a 4-symbol subslot is not used for PUCCH.

In another case, the PUCCH resources may be configured in a subset of the subslots only. The subset pattern and indexes may be configured by higher layer signaling. This reduces the PUCCH resource overhead by limiting the PUCCH resources in a subset of subslots.

In yet another case, multiple subsets of subslots may be configured, and PUCCH resources may be configured independently in each subset of subslots. Thus, different PUCCH configurations may be applied to different sets of subslots. For example, in the case of 3 and 4 symbol subslots, a different subset can be formed for subslots with different durations, and the same or different PUCCH resource configurations can be used in the different subsets with different durations. This can optimize the resource allocation in each subslot based on the duration of the subslot.

The UE 102 may be configured with multiple subslot structures for PUCCH resource allocation. The PUCCH resources may be configured independently in each subslot structure, and different PUCCH resource configurations may be applied to different subslot structure. For example, an enhanced PUCCH format 0 can be configured for 1 or 2 bits in a 2-symbol subslot structure. An enhanced PUCCH format 2 can be configured for more than 2 bits in a 3 and 4 symbol structure. In a 7 symbol subslot structure, an enhanced PUCCH format 3 or PUCCH format 4 can be configured for higher HARQ-ACK payload when PDSCH aggregation is used to report multiple PDSCH transmissions.

The PUCCH resources in different subslot structures may be differentiated by different payload ranges. For example, small payload PUCCH resources can be allocated more frequently in a subslot structure with short subslot duration. Large payload PUCCH resources can be configured in a subslot structure with longer subslot duration.

The PUCCH resources in different subslot structures may be differentiated by different latency requirements. For example, PUCCH resources can be allocated more frequently in a subslot structure with short subslot duration for ultra-low latency traffic. PUCCH resources can be configured in a subslot structure with longer subslot duration for low latency traffic.

In another case, the PUCCH resources in different subslot structures may be configured for different URLLC services based on the reliability and latency requirements.

Slot level configuration is also described herein. If the PUCCH for URLLC HARQ-ACK feedback is configured at slot level, multiple starting symbol positions may be configured for a PUCCH format (e.g., in a given PUCCH format) besides the number of symbols nrofSymbols parameter, the startingSymbolIndex parameter should be enhanced to configure multiple starting symbol positions in a slot as illustrated in Listing 2.

| Listing 2 | |
| --- | --- |
| startingSymbolIndex | {indexes of the of starting symbol positions in a slot}, |
| or | |
| startingSymbolIndex | {index of a RRC configured set of starting symbol positions in a slot}, |

Figure 6:
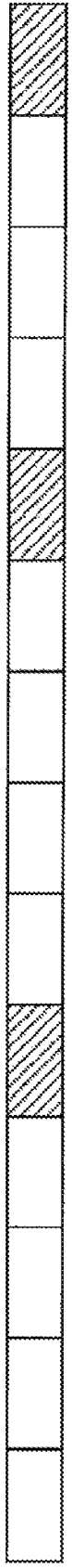
FIG. 6 illustrates examples of slot-level PUCCH configuration with multiple starting symbol positions.
Figure 6:
Figure 6:
Figure 6:
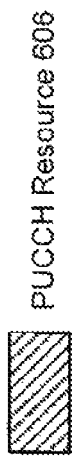

The PUCCH resources in a slot should not overlap with each other in the time domain. Each PUCCH resource should be contained within a slot, and not cross a slot boundary. Therefore, the number of PUCCH resources that can be configured in a slot depends on the number of symbols in the configured PUCCH format. For an enhanced short PUCCH format 0 or PUCCH format 2 with one symbol duration, up to 14 PUCCH resources may be configured in a slot. For an enhanced short PUCCH format 0 or PUCCH format 2 with two symbol duration, up to 7 PUCCH resources may be configured in a slot. For an enhanced long PUCCH format 1,3,4, with four symbol durations, up to 3 PUCCH resources may be configured in a slot. For an enhanced long PUCCH format 1,3,4, with 5 to 7 symbol durations, up to 2 PUCCH resources may be configured in a slot. FIG. 6 shows several examples of multiple starting positions for PUCCH formats with different durations.

As described above, the UE 102 may transmit on the PUCCH for URLLC, HARQ-ACK of URLLC DL data (e.g., URLLC PDSCH transmission). Also, the UE 102 may transmit on the PUCCH for eMBB, HARQ-ACK of eMBB DL data (e.g., cMBB PDSCH transmission).

Namely, for the HARQ-ACK transmission corresponding to URLLC DL data, the UE 102 may use the PUCCH resource for URLLC. Also, for the HARQ-ACK transmission corresponding to cMBB DL data, the UE 102 may use the PUCCH resource for cMBB.

Here, the PDSCH corresponding to URLLC DL data and/or the PDSCH corresponding to eMBB DL data may be identified based on a parameter(s) configured by the gNB 160. For example, the gNB 160 may transmit by using the RRC message, the parameter(s) used for identifying that the PDSCH transmission is corresponding to URLLC DL data or eMBB DL data.

Also, the PDSCH corresponding to URLLC DL data may be scheduled (e.g., identified) by using the DCI format(s) with CRC scrambled by Y-RNTI different from the C-RNTI. Here, the PDSCH corresponding to eMBB DL data may be scheduled (e.g., identified) by using the DCI format(s) with CRC scrambled by the C-RNTI. Here, the Y-RNTI may be used for identifying a first CQI table and/or a first MCS table. Also, the C-RNTI may be used for identifying a second CQI table and/or a second MCS table. The first and second CQI tables may be used for interpretation of CQI indices for CQI reporting. Also, the first and second MCS tables may be used to determine a modulation order and/or a target error rate. Namely, the PDSCH corresponding to URLLC DL data and/or the PDSCH corresponding to eMBB DL data may be identified based on a corresponding CQI table(s) and/or MCS table(s).

Also, the PDSCH corresponding to URLLC DL data and/or the PDSCH corresponding to cMBB DL data may be identified based on a duration(s) of PDSCH transmission(s). Here, the duration(s) of PDSCH transmission(s) may be configured and/or indicated by the gNB 160. For example, the gNB 160 may transmit by using the RRC message, information used for configuring (e.g., determining) the duration(s) of the PDSCH transmission(s). Also, the gNB 160 may transmit by using the DCI format(s), information used for indicating the duration(s) of the PDSCH transmission(s). For example, the duration(s) for the PDSCH corresponding to URLLC DL data may be a symbol level(s) (e.g., 2 symbols, 3 symbols, and/or 5 symbols). The duration for the PDSCH corresponding to eMBB DL data may be a slot level (e.g., 1 slot, 2 slots, 5 slots). Namely, the PDSCH transmission corresponding to URLLC DL data may support a shorter duration(s) than the PDSCH transmission corresponding eMBB DL data.

HARQ-ACK feedback timing is also described herein. A UE 102 may transmit one or more PUCCHs on a serving cell in different symbols within a slot of $N_{symb}^{slot}$ symbols. With reference to slots for PUCCH transmissions, if the UE 102 detects a DCI format 1_0 or a DCI format 1_1 scheduling a PDSCH reception or a DCI format 1_0 indicating an semi-persistent scheduling (SPS) PDSCH release over a number of symbols where the last symbol is within slot n, the UE 102 shall provide corresponding HARQ-ACK information in a PUCCH transmission within slot n+k, where k is a number of slots and is indicated by the PDSCH-to-HARQ-timing-indicator field in the DCI format.

For DCI format 1_1, the PDSCH-to-HARQ-timing-indicator field values map to values for a number of slots indicated by higher layer parameter DL-data-DL-acknowledgement from a set of number of slots provided by higher layer parameter Slot-timing-value-K1.

For DCI format 1_0, the PDSCH-to-HARQ-timing-indicator field values map to {1, 2, 3, 4, 5, 6, 7, 8}. For a PDSCH reception in slot n without an associated DCI format 1_0 or DCI format 1_1 detection and for HARQ-ACK transmission in a PUCCH, the UE 102 may transmit the PUCCH in slot n+k unless the UE 102 is provided higher layer parameter UL-DL-configuration-common, or higher layer parameter UL-DL-configuration-common-Set2, or higher layer parameter UL-DL-configuration-dedicated indicating at least one symbol for the PUCCH transmission in slot n+k as a downlink symbol.

If the UE 102 detects a DCI format that does not include a PDSCH-to-HARQ-timing-indicator field and schedules a PDSCH reception over a number of symbols where the last symbol is within slot n, the UE 102 may provide corresponding HARQ-ACK information in a PUCCH transmission within slot n+k.

In NR, the HARQ-ACK feedback timing is determined by PDSCH-to-HARQ-timing-indicator field. The PDSCH-to-HARQ-timing-indicator field indicates the number of slots for HARQ-ACK feedback after the PDSCH reception.

For URLLC traffic, the HARQ-ACK is reported very quickly (e.g., within a slot). One or more HARQ-ACK feedback may need to be fit in a 1 ms subframe. Therefore, the PDSCH-to-HARQ-timing-indicator field to indicate the number of slots may not be sufficient for URLLC PDSCH transmissions.

Depending on the PUCCH resources configuration, methods may be implemented to determine the HARQ-ACK feedback timing and the PUCCH resource for HARQ-ACK reporting of URLLC PDSCH transmissions.

In a first method (Method 1), HARQ-ACK timing is based on an explicit timing indication with re-interpretation of the PDSCH-to-HARQ-timing indicator field. HARQ-ACK timing may be indicated in DCI, by the PDSCH-to-HARQ-timing indicator field. The PDSCH-to-HARQ-timing indicator may be reused. However, for URLLC or subslot PDSCH transmissions, it should be linked to a different RRC configured table, or point to a table with fixed values. The values in the new RRC configured HARQ-ACK timing table may be used to interpret differently from the legacy HARQ-ACK timing table in the current NR specification.

In one approach, instead of indicating the number of slots, the value indicated by the PDSCH-to-HARQ-timing indicator may be used to indicate the number of symbols after the last symbol of a URLLC or subslot PDSCH transmission.

At least two PUCCH for HARQ-ACK of URLLC PDSCH transmissions in a slot should be supported. Thus, the distance between two PUCCH resources is at most 7 symbols. Considering the PDSCH duration and PDSCH processing time at the UE side, 3 bits of PDSCH-to-HARQ-timing indicator may be sufficient to indicate all possible starting symbols between two PDSCH transmissions and consecutive PUCCH resources.

However, a symbol level HARQ-ACK timing indication may provide unnecessary complexity and overhead for PUCCH resource indication. For example, a symbol level indication implies that a PUCCH may start from any symbol in a slot. This may limit the PUCCH formats that can be configured for the HARQ-ACK feedback. Especially, if a PUCCH resource cannot be allocated across slots, only 1-symbol PUCCH may be used to satisfy the required flexibility of symbol level indication. Furthermore, if the PUCCH resources are configured at subslot level, the symbol level indication may have to indicate the starting symbol of the PUCCH resource within a subslot, which provides redundant information and is error prone if the indication is not consistent with the configured PUCCH resources.

Therefore, in another approach, instead of indicating the number of slots or the number of symbols, the value indicated by the PDSCH-to-HARQ-timing indicator may be used to indicate the number of subslots after the last symbol of the PDSCH transmission. With a subslot structure, for HARQ-ACK timing, several methods are described to determine the reference subslot duration.

In one method, the subslot duration and structure may be determined by the uplink subslot duration for PUCCH resources configuration. This is beneficial especially if a subslot structure is only configured for PUCCH resource allocation. With a configured subslot structure for PUCCH resource allocation, the PUCCH resources can be configured in each subslot of a configured subslot structure. Multiple sets of PUCCH resources can be configured in each subslot. Each PUCCH resource set may be configured for a payload range. Each resource set may contain PUCCH resources with the same or different formats, with the same or different starting positions in a subslot. A single PUCCH resource should not cross over a subslot boundary.

The same PUCCH configuration can be applied to all subslots. In the case of different duration for the subslots (e.g., in case of 3 and 4 symbol subslot structure), the same PUCCH configuration should be determined based on the subslot with shorter duration. In this method, the HARQ-ACK timing is indicated by the PDSCH-to-HARQ-timing indicator on the number of subslots based on PUCCH subslot structure after the last symbol of the URLLC PDSCH transmission.

Figure 22:
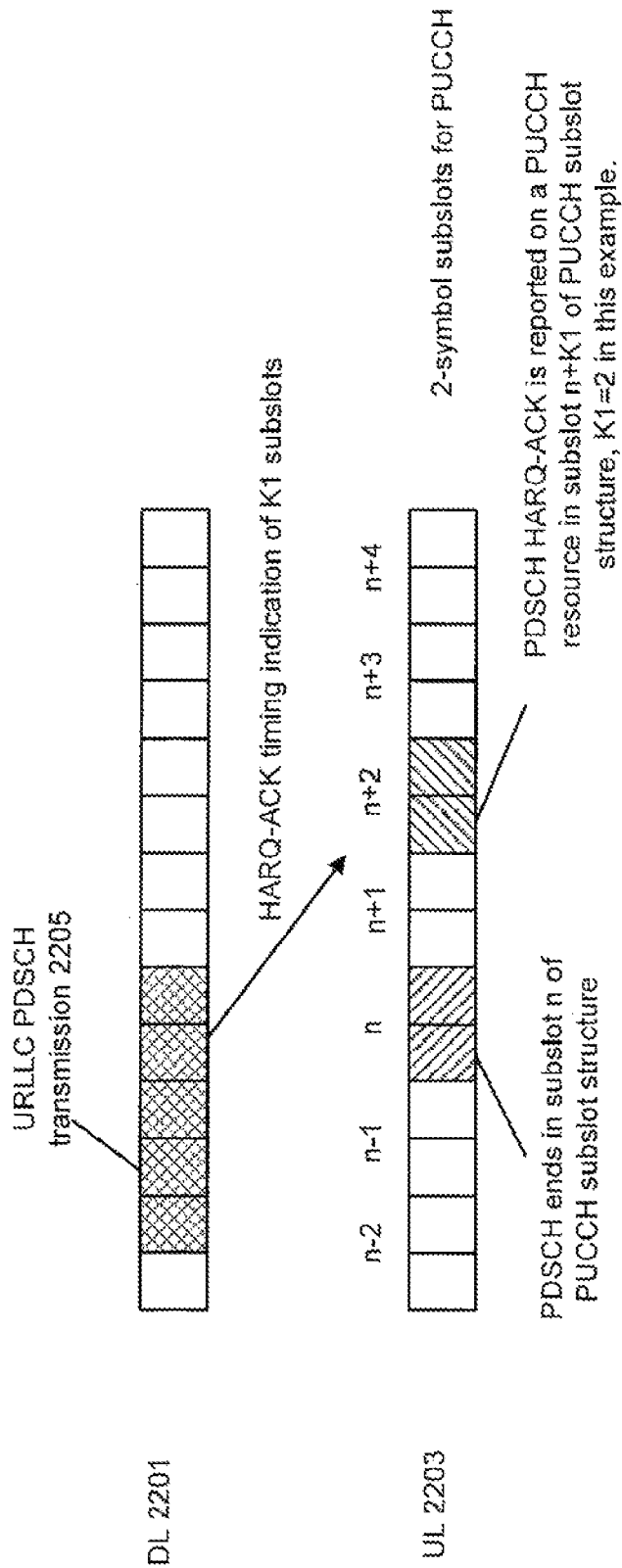
FIG. 22 illustrates an example of HARQ-ACK timing based on the subslot duration of a PUCCH configuration.

For example, if the last symbol of the PDSCH is within subslot n of the subslot structure for PUCCH allocation, the PDSCH-to-HARQ-timing indicator indicates a number of subslots K1, then the PUCCH resource in subslot n+K1 is used to feedback the HARQ-ACK of the corresponding PDSCH transmission, as shown in FIG. 22.

In this method, the timing is independent of DL subslot configuration. The PDSCH may be scheduled based on a DL subslot structure. The DL subslot structure may be the same or different from the UL subslot structure. The PDSCH may be scheduled without a subslot structure, and scheduling by dynamic DCI indication. The PDSCH with different durations that end in the same subslot of PUCCH configuration, may be reported on the same PUCCH resource if the same K1 is indicated by the PDSCH-to-HARQ-timing indicator.

In general, if the PUCCH resource is available in any subslot based on a configured subslot structure, the PUCCH should be transmitted in a subslot based on the determined HARQ-ACK timing. On the other hand, if the PUCCH resource is limited to a subset of subslots in a subslot structure, the PUCCH should be transmitted on the earliest PUCCH resource in a subslot that satisfies the HARQ-ACK timing indication (i.e., start at the same symbol or later based on the determined HARQ-ACK timing).

In the case that a single subslot structure is configured for PUCCH resource allocation, PDSCH with different durations or payload sizes may require different processing time, a RRC configured sets of K1 values may be used to signal the HARQ-ACK timing indicated by the PDSCH-to-HARQ-timing indicator. In one case, the set K1 values should cover potential processing time for a PDSCH with longer duration or large payload. In another case, multiple sets of tables of K1 values may be configured by higher layer signaling. The UE 102 may determine the table based on the PDSCH duration or payload size, then select the K1 value in the corresponding table by the index value from the PDSCH-to-HARQ-timing indicator. Therefore, a UE 102 may be configured with one or more sets of values for the PDSCH-to-HARQ-timing indicator. The set is selected based on the PDSCH durations or payload sizes.

In another method, the subslot duration is determined based on the duration of the corresponding subslot PDSCH transmission. In this method, the subslot PDSCH duration may be different from the PUCCH duration configured by a subslot structure. Furthermore, the subslot PDSCH duration may be variable, and may be different for different PDSCH transmissions. Therefore, the same K1 value for different PDSCH durations may indicate different HARQ-ACK timing after the PDSCH transmission.

Figure 23:
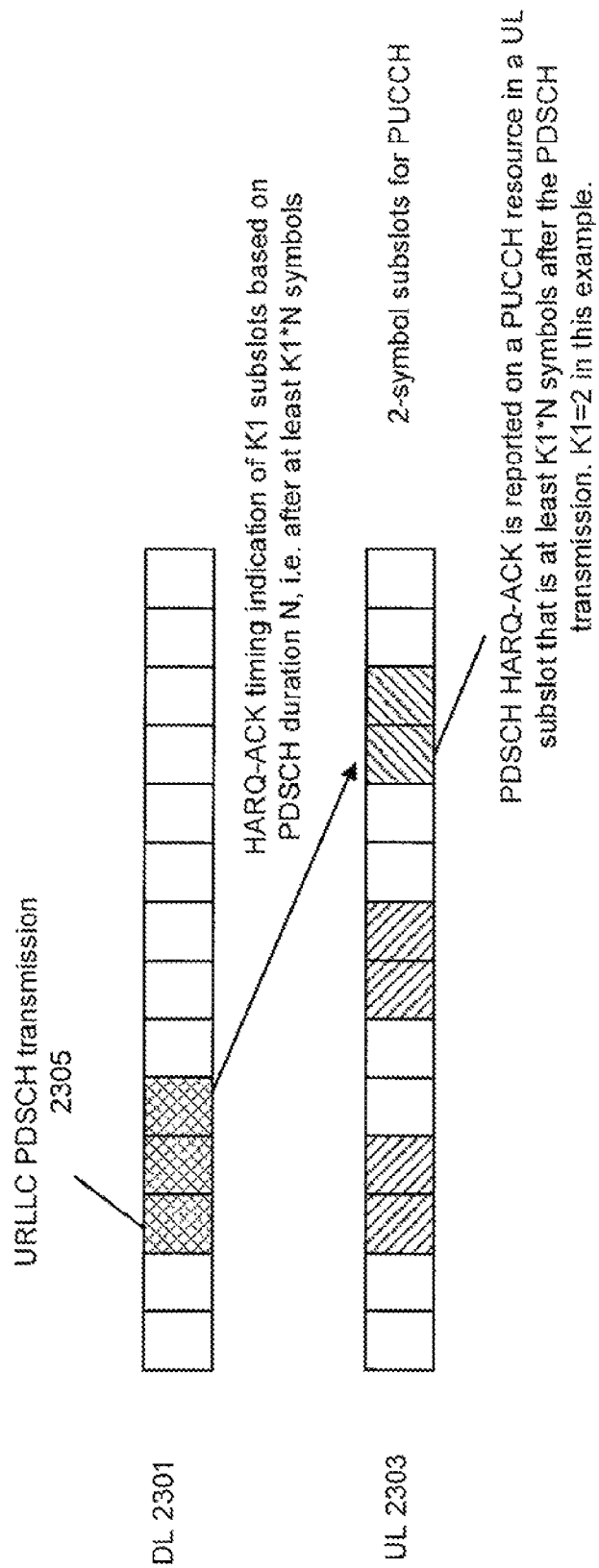
FIG. 23 illustrates an example of HARQ-ACK timing based on the subslot duration of a PDSCH transmission.

This may be similar to sTTI design in LTE, where the PDSCH HARQ-ACK timing is determined based on the DL sTTI duration. This is beneficial because the UE 102 may use different processing times based on the duration of a PDSCH transmission. FIG. 23 shows an example, assuming the PDSCH has a duration of N symbols, and K1 is indicated by the PDSCH-to-HARQ-timing indicator, the PUCCH resource in an earliest subslot after K1*N symbols of the last symbol of the PDSCH transmission should be used.

To reduce the complexity of HARQ-ACK timing calculation based on PDSCH duration, the PDSCH durations may be grouped, and a common duration may be used for a range of PDSCH durations. For example, for a PDSCH duration of 1-3 symbols, duration of N=2 is used when calculating the HARQ-ACK timing with K1 indicated by the PDSCH-to-HARQ-timing indicator; for a PDSCH duration of 4-7 symbols, duration of N=4 is used when calculating the HARQ-ACK timing with K1 indicated by the PDSCH-to-HARQ-timing indicator; for a PDSCH duration above 7 symbols, duration of N=7 is used when calculating the HARQ-ACK timing with K1 indicated by the PDSCH-to-HARQ-timing indicator. In all cases, after the HARQ-ACK timing is determined, the PUCCH resource may be selected in a subslot based on the calculated timing.

In general, if the PUCCH resource is available in any subslot based on a configured subslot structure, the PUCCH should be transmitted in a subslot based on the determined HARQ-ACK timing. On the other hand, if the PUCCH resource is limited to a subset of subslots in a subslot structure, the PUCCH should be transmitted on the earliest PUCCH resource in a subslot that satisfies the HARQ-ACK timing indication (i.e., start at the same symbol or later based on the determined HARQ-ACK timing).

In another case, the UE 102 can be configured with multiple subslot structures, and different PUCCH resources sets can be configured following different subslot structure configurations. The PUCCH subslot structure and PUCCH resource used for a URLLC PDSCH transmission may be determined based on the PDSCH duration. If the PDSCH duration is less than or equal to a pre-defined or configured duration of L1, the PUCCH resource with a subslot structure of a shorter duration may be used for HARQ-ACK reporting. If the PDSCH duration is longer than a pre-defined or configured duration of L1, the PUCCH resource with a subslot structure of a longer duration may be used for HARQ-ACK reporting.

More than one threshold values may be applied if more than two subslot structures are configured. For example, a UE 102 may be configured with a 2-symbol subslot structure, and a 7-symbol subslot structure, and PUCCH resources are configured for both subslot structures. If the PDSCH duration is less or equal to 7 symbols, a PUCCH resource with 2-symbol subslot structure is used for HARQ-ACK reporting. If the PDSCH duration is greater than 7 symbols, a PUCCH resource with 7-symbol subslot structure is used for HARQ-ACK reporting. Consequently, the UE 102 may be configured with one or more tables for the set of K1 values for the PDSCH-to-HARQ-timing indicator. The UE 102 should choose the table for the selected subslot structure to determine the HARQ-ACK timing and the PUCCH resource in the subslot with the given subslot structure.

In a second method (Method 2), HARQ-ACK timing is determined based on a pre-defined or configured HARQ-ACK timing table. In this method, a UE 102 may determine the HARQ-ACK timing using a separate HARQ-ACK timing table based on the processing time requirements and/or UE capability, etc. If a subslot structure is configured for PUCCH resource allocation, the HARQ-ACK timing may be indicated by the number of subslots after the last symbol of the PDSCH transmission. In one method, the subslot duration and structure is determined by the uplink subslot duration for PUCCH resources configuration. In another method, the subslot duration is determined based on the duration of the corresponding subslot PDSCH transmission. The detailed subslot duration determination may be the same as disclosed above in method 1.

Once the reference subslot duration is determined, a HARQ-ACK timing table may be configured to a UE 102 by RRC signaling to indicate the number of subslots required for the HARQ-ACK feedback. In one approach, the HARQ-ACK timing table may correspond to MCS settings or Transport Block (TB) sizes. The number of entries in the table can be limited to 4 or 8. A pseudo-code structure may be as follows:

If the TB size is smaller than or equal to a threshold P0, the HARQ-ACK is reported k0 subslots after the last symbol of the PDSCH transmission;

If the TB size is larger than P0 and smaller than or equal to a threshold P1, the HARQ-ACK is reported k1 subslots after the last symbol of the PDSCH transmission, where k1>k0;

If the TB size is larger than P1 and smaller than or equal to a threshold P2 the HARQ-ACK is reported k2 subslots after the last symbol of the PDSCH transmission, where k2>k1; And so on . . . .

In an example, if the TB size is less than or equal to 512, HARQ-ACK is reported 2 subslots after the PDSCH transmission. If the TB size is greater than 512 and less than or equal to 1024, HARQ-ACK is reported 4 subslots after the PDSCH transmission, etc.

In another approach, the HARQ-ACK timing table may correspond to the number of symbols of the PDSCH transmission. The number of entries in the table can be limited to 4 or 8. A pseudo-code structure may be as follows:

If the number of symbols of the PDSCH transmission is smaller than or equal to a threshold N0, the HARQ-ACK is reported k0 subslots after the last symbol of the PDSCH transmission;

If the number of symbols of the PDSCH transmission is larger than N0 and smaller than or equal to a threshold N1, the HARQ-ACK is reported k1 subslots after the last symbol of the PDSCH transmission, where k1>k0;

If the number of symbols of the PDSCH transmission is larger than a threshold N1 and smaller than or equal to a threshold N2, the HARQ-ACK is reported k2 subslots after the last symbol of the PDSCH transmission, where k2>k1; And so on . . . .

In an example, if the number of symbols of the PDSCH transmission is less than or equal to 4 symbols, HARQ-ACK is reported 2 subslots after the PDSCH transmission. If the number of symbols of the PDSCH transmission is greater than 4 symbols and less than or equal to 7 symbols, HARQ-ACK is reported 4 subslots after the PDSCH transmission, etc.

In yet another approach, the HARQ-ACK timing table may correspond to the PDSCH duration. The number of entries in the table can be limited to 4 or 8. A pseudo-code structure may be as follows:

If the duration of the PDSCH transmission is smaller than or equal to a threshold L0, the HARQ-ACK is reported k0 subslots after the last symbol of the PDSCH transmission;

If the duration of the PDSCH transmission is larger than L0 and smaller than or equal to a threshold L1, the HARQ-ACK is reported k1 subslots after the last symbol of the PDSCH transmission, where k1>k0;

If the duration of the PDSCH transmission is larger than L1 and smaller than or equal to a threshold L2, the HARQ-ACK is reported k2 subslots after the last symbol of the PDSCH transmission, where k2>k1; And so on . . . .

In an example, if the duration of the PDSCH transmission is less than or equal to ⅛ ms, HARQ-ACK is reported 2 subslots after the PDSCH transmission; if the number of symbols of the PDSCH transmission is greater than ⅛ ms and less than or equal to ¼ ms, HARQ-ACK is reported 4 subslots after the PDSCH transmission, etc.

In yet another approach, the processing timing in the table may be determined by the UE capability. A fixed value may be specified for each category of UE capability, or a separate value may be configured for the UE 102 based on its UE capability, so that the minimum HARQ-ACK timing can be determined based on the UE capability.

In one case, PUCCH resources may be available in all subslots following a configured subslot structure. In another case, PUCCH resources may be available in a subset of subslots following a higher layer signaling. Regardless of which method is used to determine the HARQ-ACK timing, the actual PUCCH resource to be used for HARQ-ACK reporting is closely related to the HARQ-ACK resource configuration. In the case of subslot PUCCH allocations, the earliest PUCCH resource that satisfied the HARQ-ACK timing should be used.

Method 2 may be beneficial if the PUCCH resources are configured periodically or are configured within a subset of subslots. This method also reduces the signaling overhead in DCI formats. Thus, in this method, the HARQ-ACK timing does not need to be indicated in the DCI, and the PDSCH-to-HARQ-timing-indicator field may be ignored or removed from the DCI format. Therefore, depending on the DCI format of a PDSCH scheduling, the HARQ-ACK timing may be determined by different methods.

If legacy DCI is used, the PDSCH-to-HARQ-timing indicator field is available in a PDSCH scheduling DCI, method 1 with explicit timing indication may be applied. In NR release 15, the explicit indication provides more flexibility for slot level HARQ-ACK feedback to signal which slot is used to report HARQ-ACK. For URLLC, it may be beneficial to indicate the HARQ-ACK timing especially if PUCCH resource is available in every symbol or subslot. On the other hand, for URLLC, it is always desirable to report the HARQ-ACK as early as possible, especially if PUCCH resources are configured with fixed symbol locations (e.g., with a period PUCCH resource or in a subset of subslots). Therefore, the PDSCH-to-HARQ-timing indicator field may not be useful for URLLC since the HARQ-ACK should be reported on the earliest available PUCCH resource anyway.

Therefore, if a compact DCI is supported for URLLC PDSCH scheduling, the PDSCH-to-HARQ-timing indicator field may be removed from the DCI. In this case, the UE 102 may determine the HARQ-ACK timing based on the processing time requirements and/or UE capability, etc. In general, the HARQ-ACK timing can be determined implicitly, and the earliest PUCCH resource that satisfied the processing time requirements should be used. If a compact DCI (also known as short DCI, or a DCI with smaller payload size) is used for PDSCH scheduling, the PDSCH-to-HARQ-timing indicator field may not be available, thus method 2 with implicit timing based on UE capability or pre-defined/configured HARQ-ACK timing table can be used.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second cNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include a gNB scheduling module 194. The gNB scheduling module 194 may perform operations for PUCCH configuration and resource allocation as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

URLLC may coexist with other services (e.g., eMBB). Due to the latency requirement, URLLC may have a highest priority in some approaches. Some examples of URLLC coexistence with other services are given herein (e.g., in one or more of the following Figure descriptions).

FIG. 2 illustrates examples of subslot structure for URLLC PUCCH allocation. The subslot indexes 204a-d for 14-symbol slots are shown.

Different subslot configurations 202 may be specified for NR. As shown in FIG. 2, potential subslot structures in a slot of 14 symbols may include one or more of the following. A first subslot configuration 202a includes seven 2-symbol subslots (i.e., 2,2,2,2,2,2,2). A second subslot configuration 202b includes {4,3,4,3}-symbol subslots. A third subslot configuration 202c includes {4,3,3,4}-symbol subslots. A fourth subslot configuration 202d includes 7-symbol subslots.

In an example, for the first subslot configuration 202a structure of a 2-symbol subslot, there are potentially 7 subslots that can carry HARQ-ACK with PUCCH feedback. However, in most cases, 2 to 4 HARQ-ACK feedback in a slot is sufficient to ensure the desired low latency requirements.

Different subslot configurations may be configured for different numerologies with different subcarrier spacing (SCS) settings. For example, for SCS with 15 kilohertz (kHz), 2-symbol or 3 and 4 symbol subslots may be used to ensure more re-transmissions occur within 1 ms. For SCS with 60 kHz, 7-symbol subslots may be sufficient to ensure re-transmissions within 1 ms.

FIG. 3 illustrates examples of PUCCH resource configuration in each subslot of FIG. 2. The subslot indexes 304a-b for 14-symbol slots are shown.

The same PUCCH configuration can be applied to all subslots, as shown in the first subslot configuration 302a of FIG. 3. The same PUCCH resource configuration may be applied in every subslot of the 2-symbol subslots.

In the case of the different duration for the subslots (e.g., in case of 3 and 4 symbol subslot structure of the second subslot configuration 302b), the same PUCCH configuration may be determined based on the subslot with shorter duration. For example, the same PUCCH resource configuration may be applied in every subslot based on the subslot with the shorter duration. In the case of the example of the second subslot configuration 302b, the 3-symbol subslot is the shorter duration.

FIG. 4 illustrates examples of PUCCH allocation in a subset of subslots of FIG. 2. The subslot indexes 404a-c for 14-symbol slots are shown.

In the example of a first subslot configuration 402a, there is a 2-symbol subslot structure. In this example, the subset may contain only subslot indexes {1,3,5}. Alternatively, the subset may contain only subslot indexes {0,2,4,6}.

In the example of a second subslot configuration 402b, there is a 2-symbol subslot structure. In this example, the subset may contain only subslot indexes {3,6}. Alternatively, the subset may contain only subslot indexes {2,5} or {1,4} or {0,3}, etc. Other combinations are not excluded. For example, subslot indexes set of {2,4,6}, {0,3,6}, etc. may be a subset of subslots for PUCCH resource configuration.

In the example of a third subslot configuration 402c, there is a {4,3,4,3}-symbol subslot pattern. In this case, PUCCH resource configuration may be applied in a subset of subslot indexes {0,2}. Alternatively, PUCCH resource configuration may be applied in a subset of subslot indexes {1,3}.

FIG. 5 illustrates examples of PUCCH configuration in multiple subsets of subslots. The subslot indexes 504a-b for 14-symbol slots are shown. In these examples, multiple subsets of subslots may be configured, and PUCCH configuration may be configured independently in each subset of subslots.

In the example of a first subslot configuration 502a, there is a 2-symbol subslot structure. In a 2-symbol subslot structure, a first PUCCH resource configuration 506a is applied to a set with subslot indexes of {1,3,5}. A second PUCCH resource configuration 506b is applied in a separate set of subslots with indexes {0,4}.

In the example of a second subslot configuration 502b, there is a {4,3,4,3}-structure. A first PUCCH resource configuration 506a is applied to a set with subslot indexes of {0,2}. A second PUCCH resource configuration 506b is applied in a separate set of subslots with indexes {1,3}. It should be noted that the PUCCH configuration in different subsets may be the same or different.

FIG. 6 illustrates examples of slot-level PUCCH configuration with multiple starting symbol positions. In a first example 601, the slot has three starting symbol positions with a 1-symbol PUCCH Resource 606. In a second example 603, the slot has two starting symbol positions with a 2-symbol PUCCH Resource 606. In a third example 605, the slot has two starting symbol positions with a 4-symbol PUCCH Resource 606.

Figure 7:
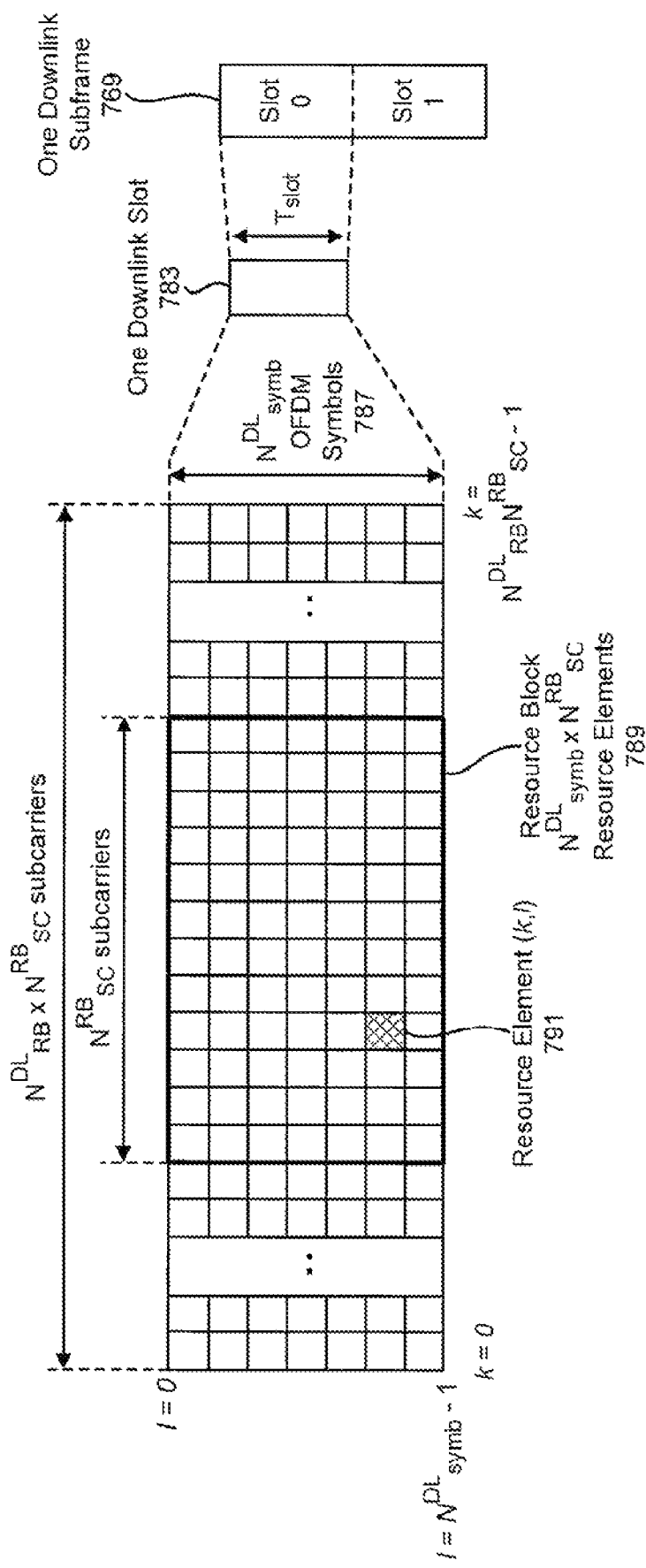
FIG. 7 is a diagram illustrating an example of a resource grid for the downlink.

FIG. 7 is a diagram illustrating an example of a resource grid for the downlink. The resource grid illustrated in FIG. 7 may be utilized in some implementations of the systems and methods disclosed herein. More detail regarding the resource grid is given in connection with FIG. 1.

In FIG. 7, one downlink subframe 769 may include two downlink slots 783. $N^{DL}_{RB}$ is downlink bandwidth configuration of the serving cell, expressed in multiples of $N^{RB}_{sc}$, where $N^{RB}_{sc}$ is a resource block 789 size in the frequency domain expressed as a number of subcarriers, and $N^{DL}_{symb}$ is the number of OFDM symbols 787 in a downlink slot 783. A resource block 789 may include a number of resource elements (RE) 791.

For a primary cell (PCell), $N^{DL}_{RB}$ is broadcast as a part of system information. For an SCell (including an Licensed Assisted Access (LAA) SCell), $N^{DL}_{RB}$ is configured by a RRC message dedicated to a UE 102. For PDSCH mapping, the available resource element (RE) 791 may be the RE 791 whose index 1 fulfils $1 \geq 1_{data,start}$ and/or $1_{data,end} \geq 1$ in a subframe.

In the downlink, the OFDM access scheme with cyclic prefix (CP) may be employed, which may be also referred to as CP-OFDM. In the downlink, PDCCH, enhanced PDCCH (EPDCCH), PDSCH and the like may be transmitted. A downlink radio frame may include multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair includes two downlink RBs that are continuous in the time domain.

The downlink RB includes twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs.

Figure 8:
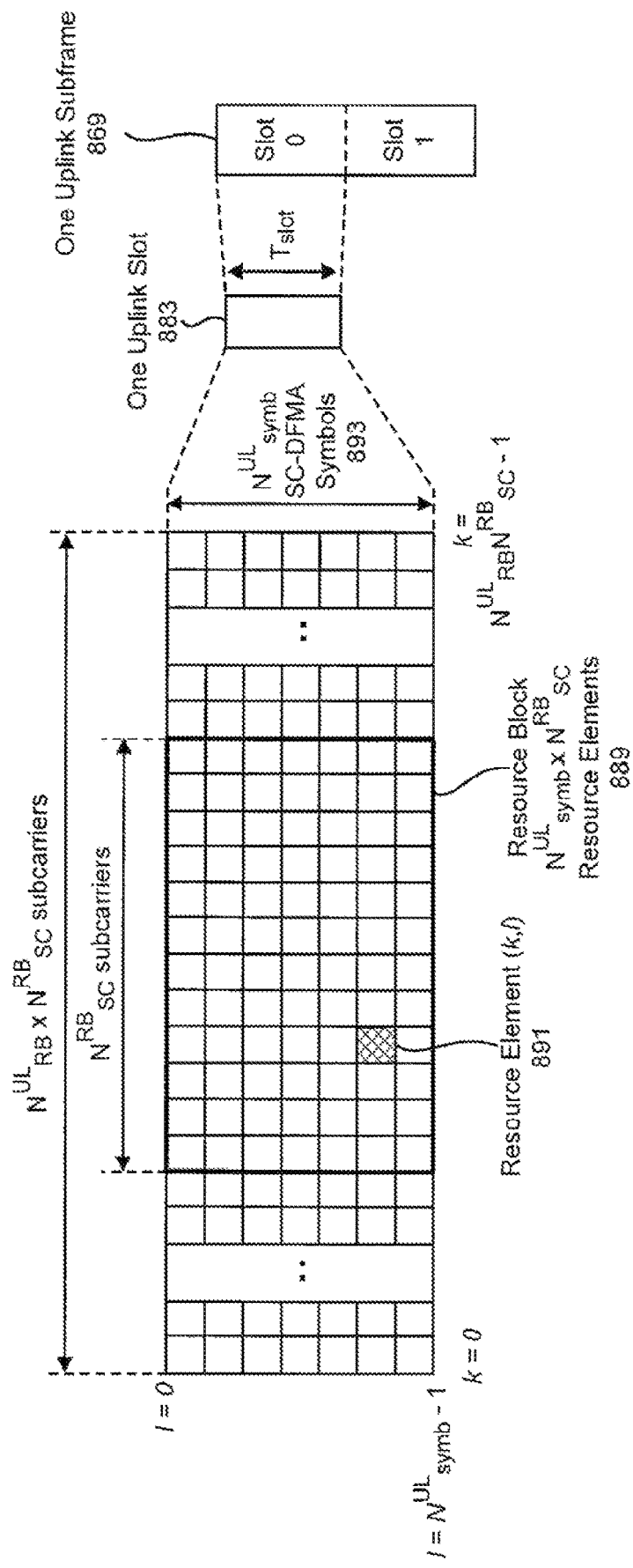
FIG. 8 is a diagram illustrating one example of a resource grid for the uplink.

FIG. 8 is a diagram illustrating one example of a resource grid for the uplink. The resource grid illustrated in FIG. 8 may be utilized in some implementations of the systems and methods disclosed herein. More detail regarding the resource grid is given in connection with FIG. 1.

In FIG. 8, one uplink subframe 869 may include two uplink slots 883. $N^{UL}_{RB}$ is uplink bandwidth configuration of the serving cell, expressed in multiples of $N^{RB}_{sc}$, where $N^{RB}_{sc}$ is a resource block 889 size in the frequency domain expressed as a number of subcarriers, and N $UL_{symb}$ is the number of SC-FDMA symbols 893 in an uplink slot 883. A resource block 889 may include a number of resource elements (RE) 891.

For a PCell, $N^{UL}_{RB}$ is broadcast as a part of system information. For an SCell (including an LAA SCell), $N^{UL}_{RB}$ is configured by a RRC message dedicated to a UE 102.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PUSCH, PRACH and the like may be transmitted. An uplink radio frame may include multiple pairs of uplink resource blocks. The uplink RB pair is a unit for assigning uplink radio resources, defined by a predetermined bandwidth (RB bandwidth) and a time slot. The uplink RB pair includes two uplink RBs that are continuous in the time domain.

The uplink RB may include twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a RE and is uniquely identified by the index pair (k,l) in a slot, where k and l are indices in the frequency and time domains, respectively. While uplink subframes in one component carrier (CC) are discussed herein, uplink subframes are defined for each CC.

Figure 9:
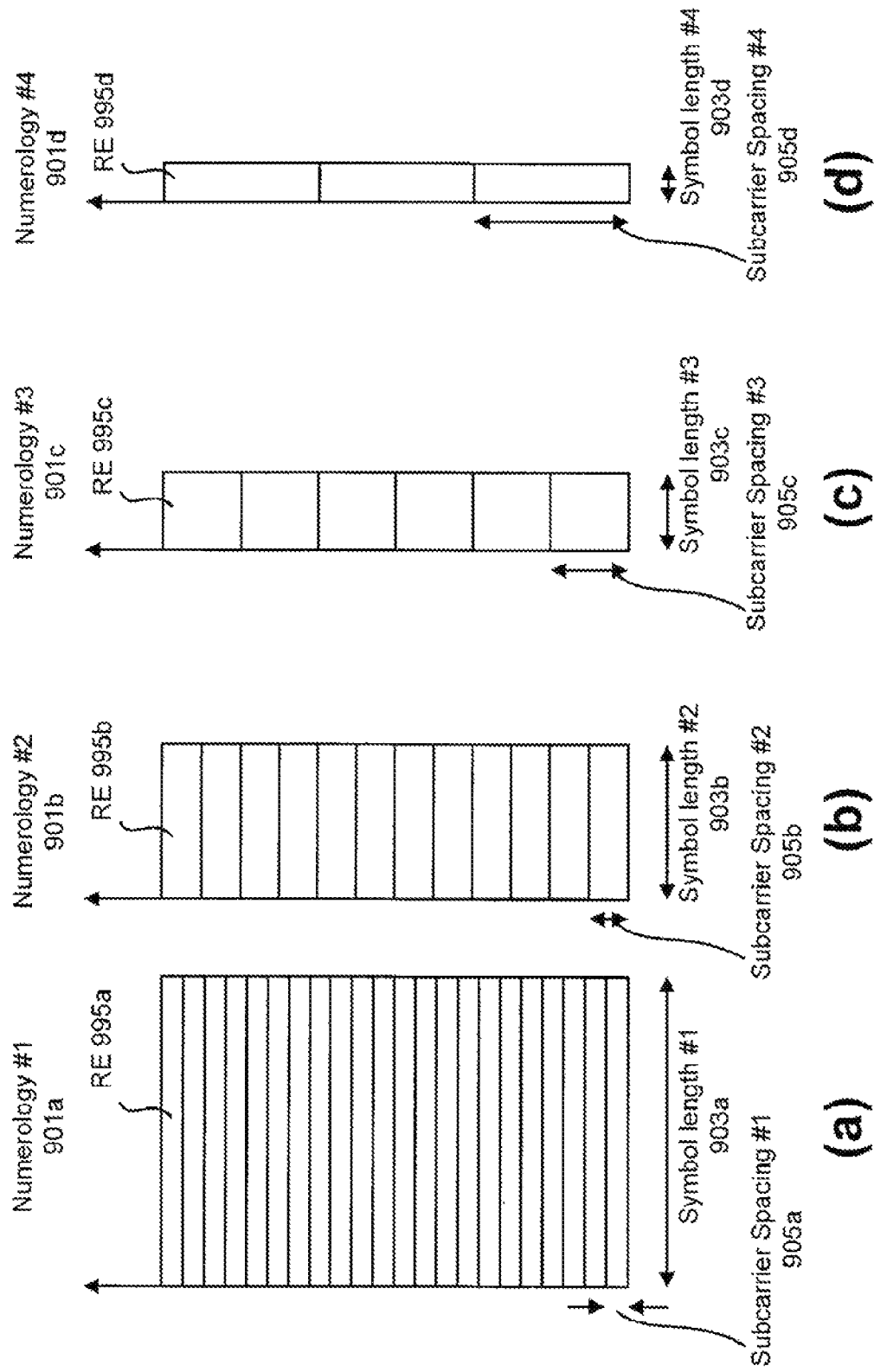
FIG. 9 shows examples of several numerologies.

FIG. 9 shows examples of several numerologies 901. The numerology #1 901a may be a basic numerology (e.g., a reference numerology). For example, a RE 995a of the basic numerology 901a may be defined with subcarrier spacing 905a of 15 kHz in frequency domain and 2048 Ts+CP length (e.g., 160 Ts or 144 Ts) in time domain (i.e., symbol length #1 903a), where Ts denotes a baseband sampling time unit defined as 1/(15000*2048) seconds. For the i-th numerology, the subcarrier spacing 905 may be equal to 15*2¹ and the effective OFDM symbol length 2048*2⁻ⁱ*Ts. It may cause the symbol length is 2048*2⁻ⁱ*Ts+CP length (e.g., 160*2⁻ⁱ*Ts or 144*2⁻ⁱ*Ts). In other words, the subcarrier spacing of the i+1-th numerology is a double of the one for the i-th numerology, and the symbol length of the i+1-th numerology is a half of the one for the i-th numerology. FIG. 9 shows four numerologies, but the system may support another number of numerologies. Furthermore, the system does not have to support all of the 0-th to the I-th numerologies, i=0, 1, . . . , I.

For example, the first UL transmission on the first SPS resource as above mentioned may be performed only on the numerology #1 (e.g., a subcarrier spacing of 15 kHz). Here, the UE 102 may acquire (detect) the numerology #1 based on a synchronization signal. Also, the UE 102 may receive a dedicated RRC signal including information (e.g., a handover command) configuring the numerology #1. The dedicated RRC signal may be a UE-specific signal. Here, the first UL transmission on the first SPS resource may be performed on the numerology #1, the numerology #2 (a subcarrier spacing of 30 kHz), and/or the numerology #3 (a subcarrier spacing of 60 kHz).

Also, the second UL transmission on the second SPS resource as above mentioned may be performed only on the numerology #3. Here, for example, the UE 102 may receive System Information (e.g., Master Information Block (MIB) and/or System Information Block (SIB)) including information configuring the numerology #2 and/or the numerology #3.

Also, the UE 102 may receive the dedicated RRC signal including information (e.g., the handover command) configuring the numerology #2 and/or the numerology #3. The System Information (e.g., MIB) may be transmitted on BCH (Broadcast Channel) and/or the dedicated RRC signal. The System Information (e.g., SIB) may contain information relevant when evaluating if a UE 102 is allowed to access a cell and/or defines the scheduling of other system information. The System Information (SIB) may contain radio resource configuration information that is common for multiple UEs 102. Namely, the dedicated RRC signal may include each of multiple numerology configurations (the first numerology, the second numerology, and/or the third numerology) for each of UL transmissions (e.g., each of UL-SCH transmissions, each of PUSCH transmissions). Also, the dedicated RRC signal may include each of multiple numerology configurations (the first numerology, the second numerology, and/or the third numerology) for each of DL transmissions (each of PDCCH transmissions).

Figure 10:
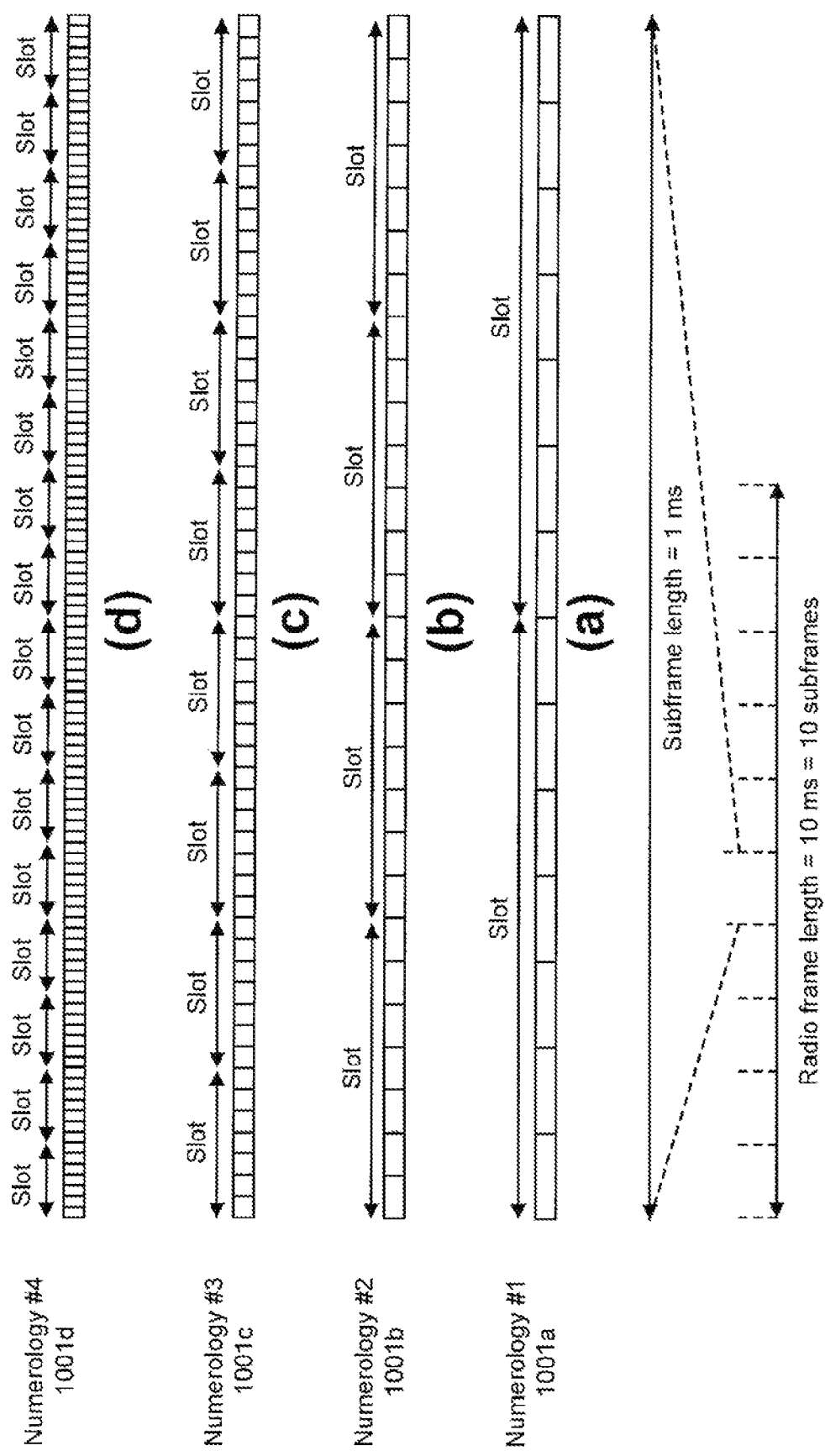
FIG. 10 shows examples of subframe structures for the numerologies that are shown in FIG. 9.

FIG. 10 shows examples of subframe structures for the numerologies 1001 that are shown in FIG. 9. Given that a slot includes $N^{DL}_{symb}$ (or $N^{UL}_{symb}$)=7 symbols, the slot length of the i+1-th numerology 1001 is a half of the one for the i-th numerology 1001, and eventually the number of slots in a subframe (i.e., 1 ms) becomes double. It may be noted that a radio frame may include 10 subframes, and the radio frame length may be equal to 10 ms.

Figure 11:
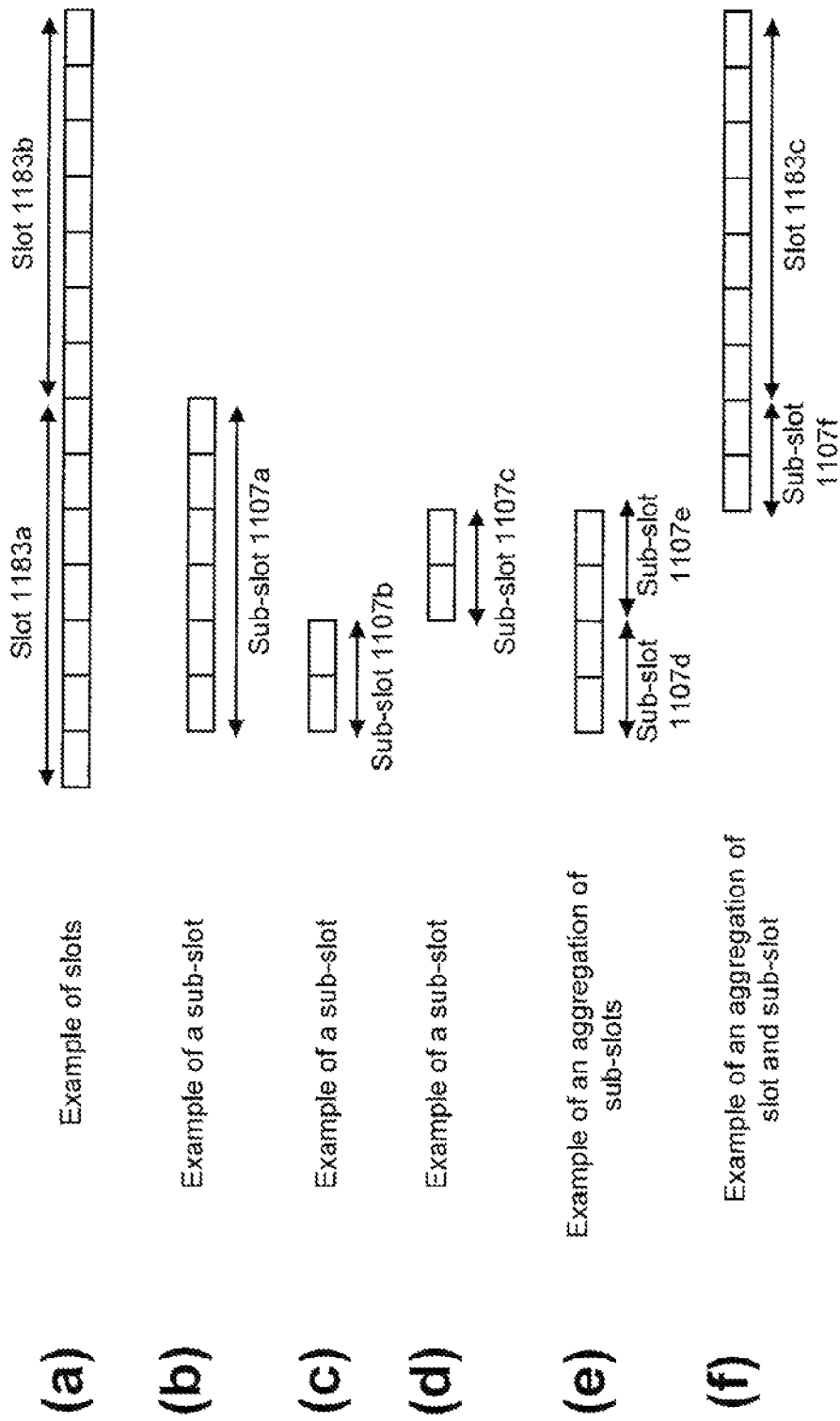
FIG. 11 shows examples of slots and subslots.

FIG. 11 shows examples of slots 1183 and subslots 1107. If a subslot 1107 is not configured by higher layer, the UE 102 and the eNB/gNB 160 may only use a slot 1183 as a scheduling unit. More specifically, a given transport block may be allocated to a slot 1183. If the subslot 1107 is configured by higher layer, the UE 102 and the eNB/gNB 160 may use the subslot 1107 as well as the slot 1183. The subslot 1107 may include one or more OFDM symbols. The maximum number of OFDM symbols that constitute the subslot 1107 may be $N^{DL}_{symb}-1$ (or $N^{UL}_{symb}-1$).

The subslot length may be configured by higher layer signaling. Alternatively, the subslot length may be indicated by a physical layer control channel (e.g., by DCI format).

The subslot 1107 may start at any symbol within a slot 1183 unless it collides with a control channel. There could be restrictions of mini-slot length based on restrictions on starting position. For example, the subslot 1107 with the length of $N^{DL}_{symb}-1$ (or $N^{UL}_{symb}-1$) may start at the second symbol in a slot 1183. The starting position of a subslot 1107 may be indicated by a physical layer control channel (e.g., by DCI format). Alternatively, the starting position of a subslot 1107 may be derived from information (e.g., search space index, blind decoding candidate index, frequency and/or time resource indices, PRB index, a control channel element index, control channel element aggregation level, an antenna port index, etc.) of the physical layer control channel which schedules the data in the concerned subslot 1107.

In cases when the subslot 1107 is configured, a given transport block may be allocated to either a slot 1183, a subslot 1107, aggregated subslots 1107 or aggregated subslot(s) 1107 and slot 1183. This unit may also be a unit for HARQ-ACK bit generation.

Figure 12:
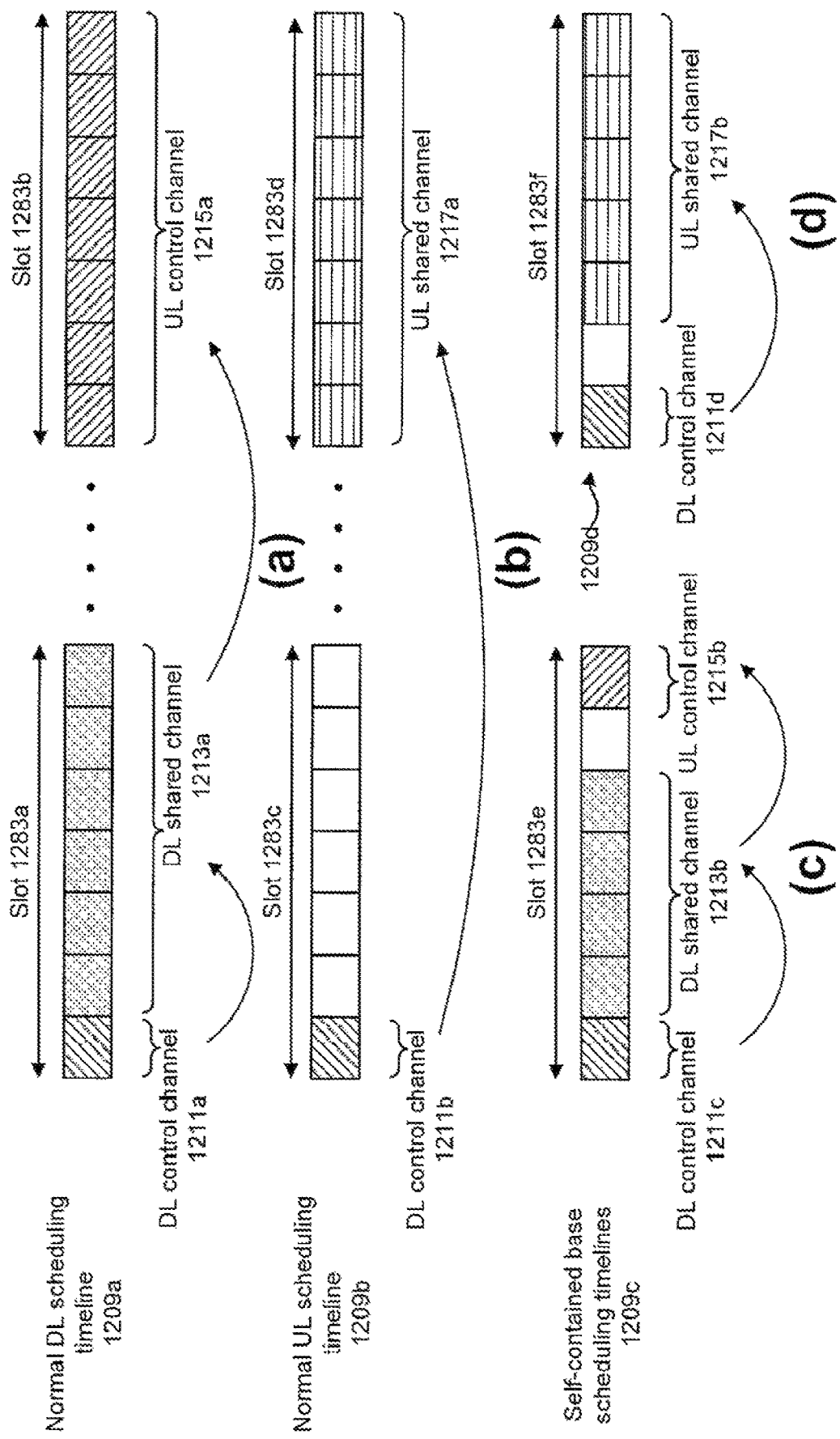
FIG. 12 shows examples of scheduling timelines.

FIG. 12 shows examples of scheduling timelines 1209. For a normal DL scheduling timeline 1209*a*, DL control channels are mapped the initial part of a slot 1283*a*. The DL control channels 1211 schedule DL shared channels 1213*a* in the same slot 1283*a*. HARQ-ACKs for the DL shared channels 1213*a* (i.e., HARQ-ACKs each of which indicates whether or not transport block in each DL shared channel 1213*a* is detected successfully) are reported via UL control channels 1215*a* in a later slot 1283*b*. In this instance, a given slot 1283 may contain either one of DL transmission and UL transmission.

For a normal UL scheduling timeline 1209*b*, DL control channels 1211*b* are mapped the initial part of a slot 1283*c*. The DL control channels 1211*b* schedule UL shared channels 1217*a* in a later slot 1283*d*. For these cases, the association timing (time shift) between the DL slot 1283*c* and the UL slot 1283*d* may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base DL scheduling timeline 1209*c*, DL control channels 1211*c* are mapped to the initial part of a slot 1283*c*. The DL control channels 1211*c* schedule DL shared channels 1213*b* in the same slot 1283*e*. HARQ-ACKs for the DL shared channels 1213*b* are reported in UL control channels 1215*b*, which are mapped at the ending part of the slot 1283*c*.

For a self-contained base UL scheduling timeline 1209*d*, DL control channels 1211*d* are mapped to the initial part of a slot 1283*f*. The DL control channels 1211*d* schedule UL shared channels 1217*b* in the same slot 1283*f*. For these cases, the slot 1283*f* may contain DL and UL portions, and there may be a guard period between the DL and UL transmissions.

The use of a self-contained slot may be upon a configuration of self-contained slot. Alternatively, the use of a self-contained slot may be upon a configuration of the subslot. Yet alternatively, the use of a self-contained slot may be upon a configuration of shortened physical channel (e.g., PDSCH, PUSCH, PUCCH, etc.).

Figure 13:
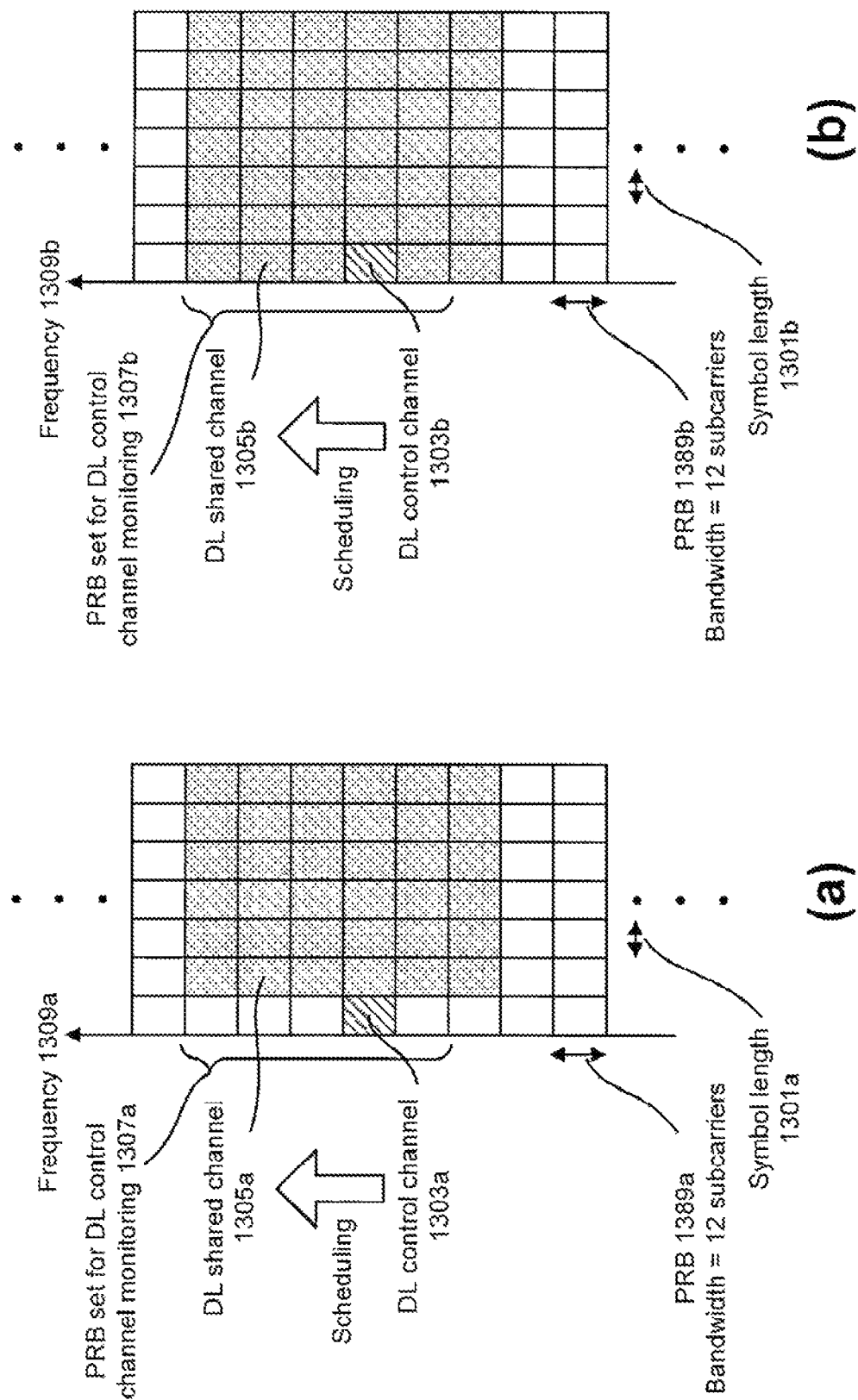
FIG. 13 shows examples of DL control channel monitoring regions.

FIG. 13 shows examples of DL control channel monitoring regions. In a first example (a), a physical resource block (PRB) 1389*a* is shown with a symbol length 1301*a* and frequency 1309*a*. In a second example (a), a physical resource block (PRB) 1389*b* is shown with a symbol length 1301*b* and frequency 1309*b*. In an implementation, the bandwidth of the PRB 1389*a,b*.

In the examples of FIG. 13, one or more sets of PRB(s) 1389 may be configured for DL control channel monitoring. In other words, a PRB set 1307*a,b* is, in the frequency domain, a set of PRBs 1389*a,b* within which the UE 102 attempts to blindly decode downlink control information, where the PRBs 1389*a,b* may or may not be frequency contiguous. A UE 102 may have one or more PRB sets 1307*a,b*, and one DCI message may be located within one PRB set 1307*a,b*. In the frequency-domain, a PRB 1389 is the resource unit size (which may or may not include Demodulation reference signals (DM-RS)) for a DL control channel 1303*a,b*. A DL shared channel 1305*a,b* may start at a later OFDM symbol than the one(s) which carries the detected DL control channel 1303*a,b*. Alternatively, the DL shared channel 1305*a,b* may start at (or earlier than) an OFDM symbol than the last OFDM symbol which carries the detected DL control channel 1303*a,b*. In other words, dynamic reuse of at least part of resources in the PRB sets 1307*a,b* for data for the same or a different UE 102, at least in the frequency domain may be supported.

Figure 14:
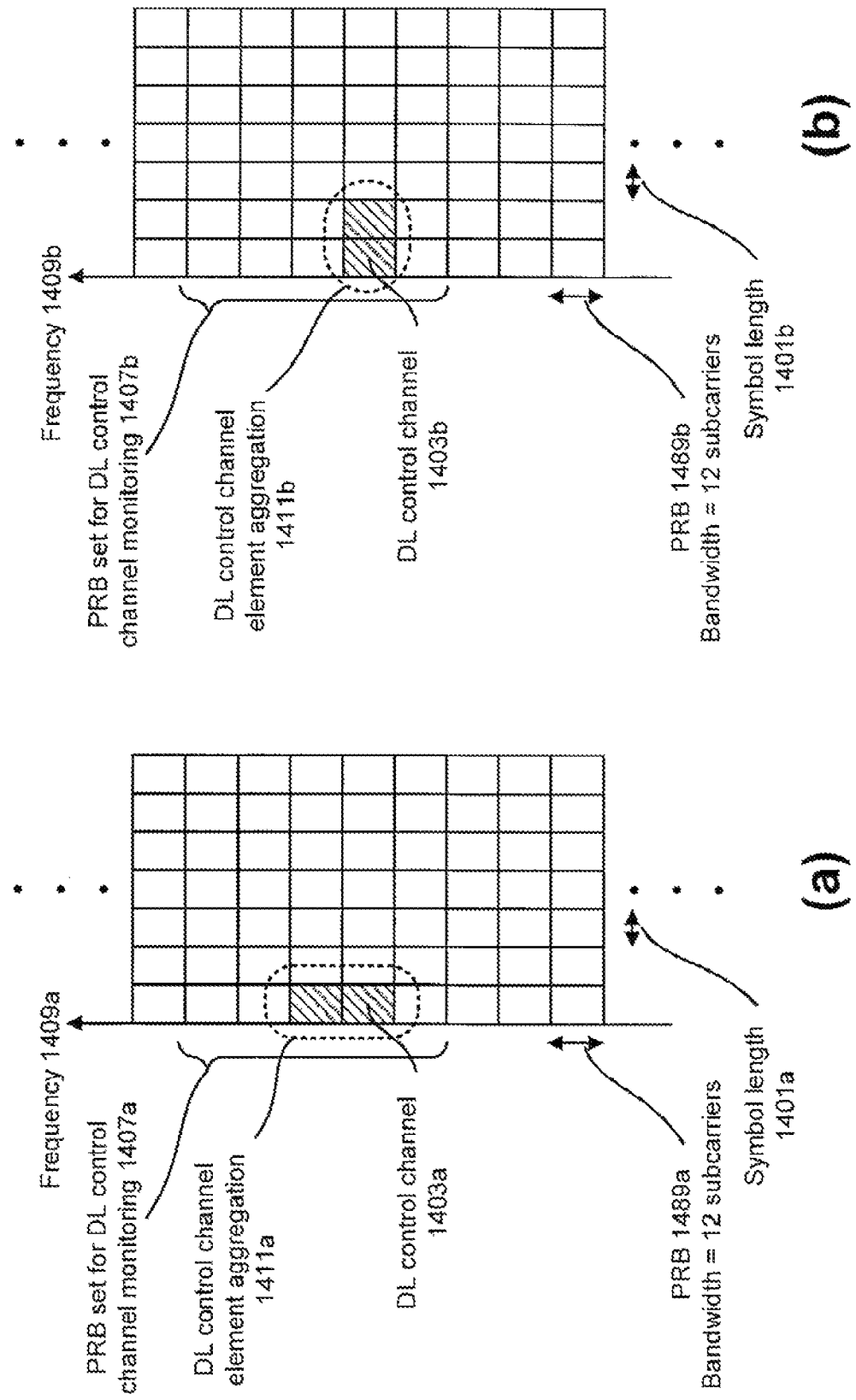
FIG. 14 shows examples of a DL control channel which includes more than one control channel element.

FIG. 14 shows examples of a DL control channel 1403*a,b* which includes more than one control channel element. In a first example (a), a physical resource block (PRB) 1489*a* is shown with a symbol length 1401*a* and frequency 1409*a*. In a second example (a), a physical resource block (PRB) 1489*b* is shown with a symbol length 1401*b* and frequency 1409*b*.

When the PRB set 1407*a,b* spans multiple OFDM symbols, a control channel candidate may be mapped to multiple OFDM symbols or may be mapped to a single OFDM symbol. One DL control channel element 1403*a,b* may be mapped on REs defined by a single PRB 1489*a,b* and a single OFDM symbol. If more than one DL control channel elements 1403*a,b* are used for a single DL control channel transmission, DL control channel element aggregation 1411*a,b* may be performed.

The number of aggregated DL control channel elements 1403*a,b* is referred to as DL control channel element aggregation level. The DL control channel element aggregation level may be 1 or 2 to the power of an integer. The gNB 160 may inform a UE 102 of which control channel candidates are mapped to each subset of OFDM symbols in the PRB set 1407*a,b*. If one DL control channel 1403*a,b* is mapped to a single OFDM symbol and does not span multiple OFDM symbols, the DL control channel element aggregation is performed within an OFDM symbol, namely multiple DL control channel elements 1403*a,b* within an OFDM symbol are aggregated. Otherwise, DL control channel elements 1403*a,b* in different OFDM symbols can be aggregated.

Figure 15:
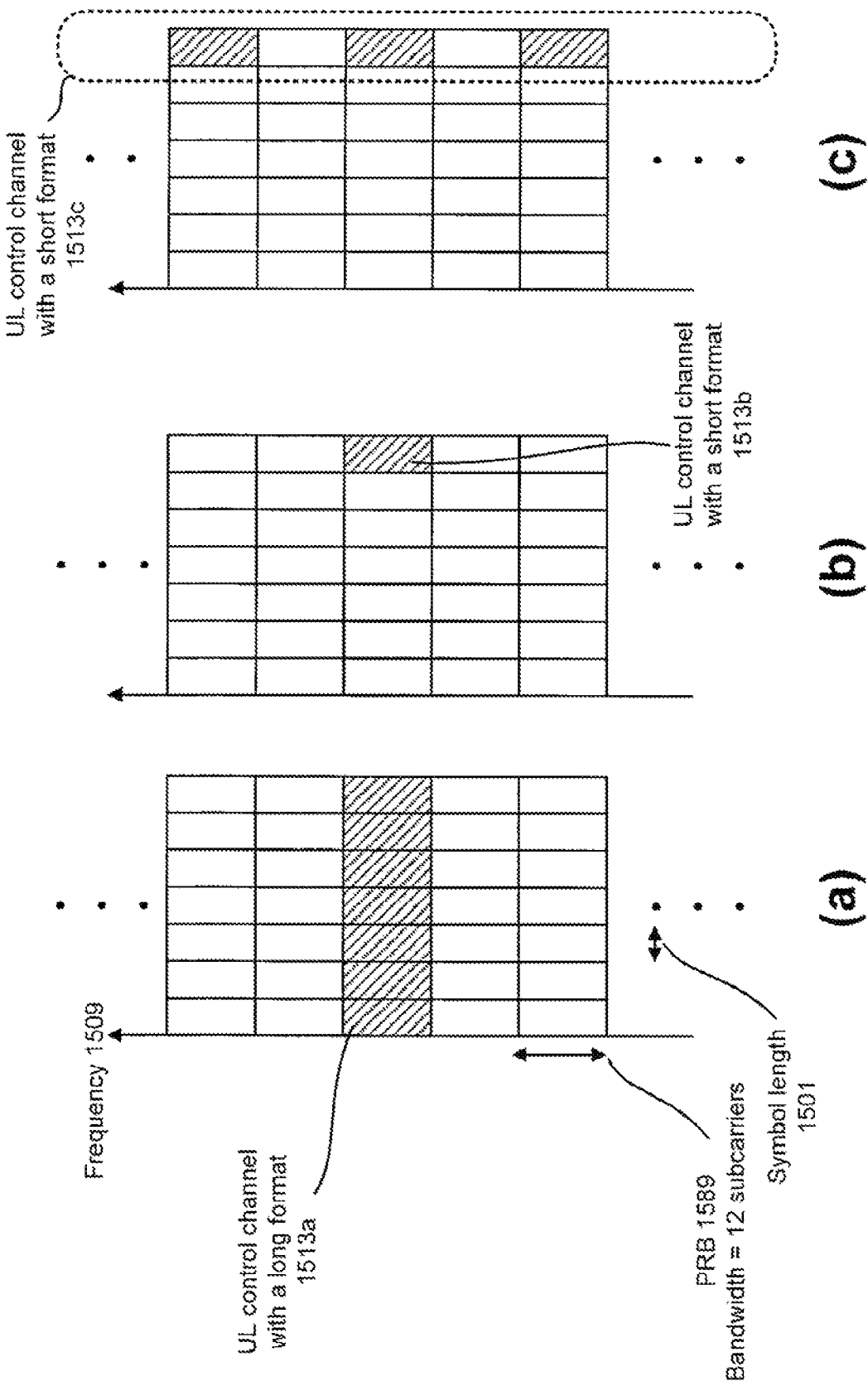
FIG. 15 shows examples of UL control channel structures.

FIG. 15 shows examples of UL control channel structures. In the examples of FIG. 15, physical resource blocks (PRBs) 1589 are shown with a symbol length 1501 and frequency 1509.

In a first example (a), the UL control channel 1513*a* may be mapped on REs which are defined by a PRB 1589 and a slot in frequency and time domains, respectively. This UL control channel 1513*a* may be referred to as a long format (or just the 1st format).

In the second example (b) and third example (c), UL control channels 1513*b,c* may be mapped on REs on a limited OFDM symbols in time domain. This may be referred to as a short format (or just the 2nd format). The UL control channels 1513*b,c* with a short format may be mapped on REs within a single PRB 1589. Alternatively, the UL control channels 1513*b,c* with a short format may be mapped on REs within multiple PRBs 1589. For example, interlaced mapping may be applied, namely the UL control channel 1513*b,c* may be mapped to every N PRBs (e.g., 5 or 10) within a system bandwidth.

Figure 16:
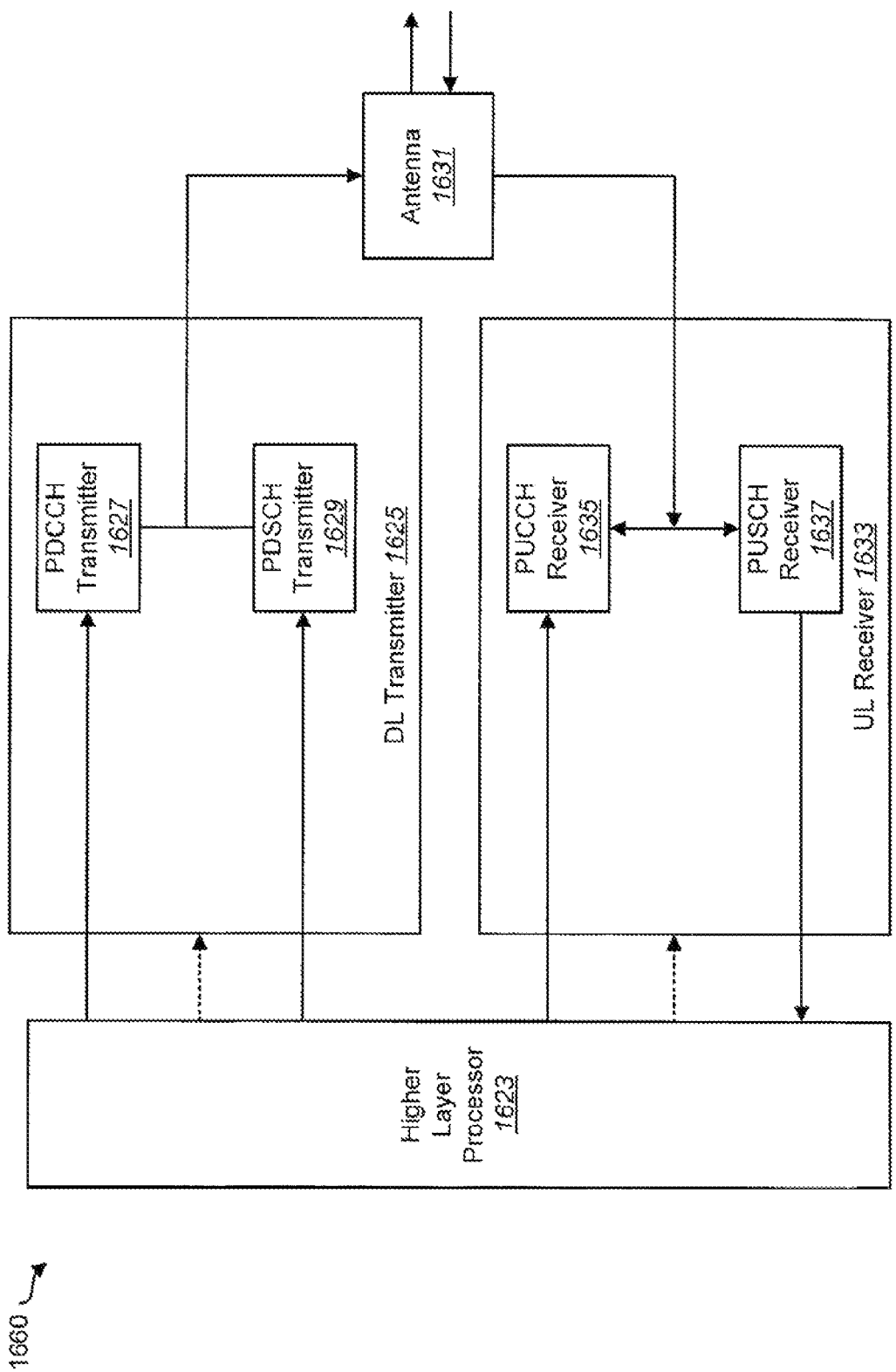
FIG. 16 is a block diagram illustrating one implementation of a gNB.

FIG. 16 is a block diagram illustrating one implementation of a gNB 1660. The gNB 1660 may include a higher layer processor 1623, a DL transmitter 1625, a UL receiver 1633, and one or more antenna 1631. The DL transmitter 1625 may include a PDCCH transmitter 1627 and a PDSCH transmitter 1629. The UL receiver 1633 may include a PUCCH receiver 1635 and a PUSCH receiver 1637.

The higher layer processor 1623 may manage physical layer's behaviors (the DL transmitter's and the UL receiver's behaviors) and provide higher layer parameters to the physical layer. The higher layer processor 1623 may obtain transport blocks from the physical layer. The higher layer processor 1623 may send/acquire higher layer messages such as an RRC message and MAC message to/from a UE's higher layer. The higher layer processor 1623 may provide the PDSCH transmitter transport blocks and provide the PDCCH transmitter transmission parameters related to the transport blocks.

The DL transmitter 1625 may multiplex downlink physical channels and downlink physical signals (including reservation signal) and transmit them via transmission antennas 1631. The UL receiver 1633 may receive multiplexed uplink physical channels and uplink physical signals via receiving antennas 1631 and de-multiplex them. The PUCCH receiver 1635 may provide the higher layer processor 1623 UCI. The PUSCH receiver 1637 may provide the higher layer processor 1623 received transport blocks.

Figure 17:
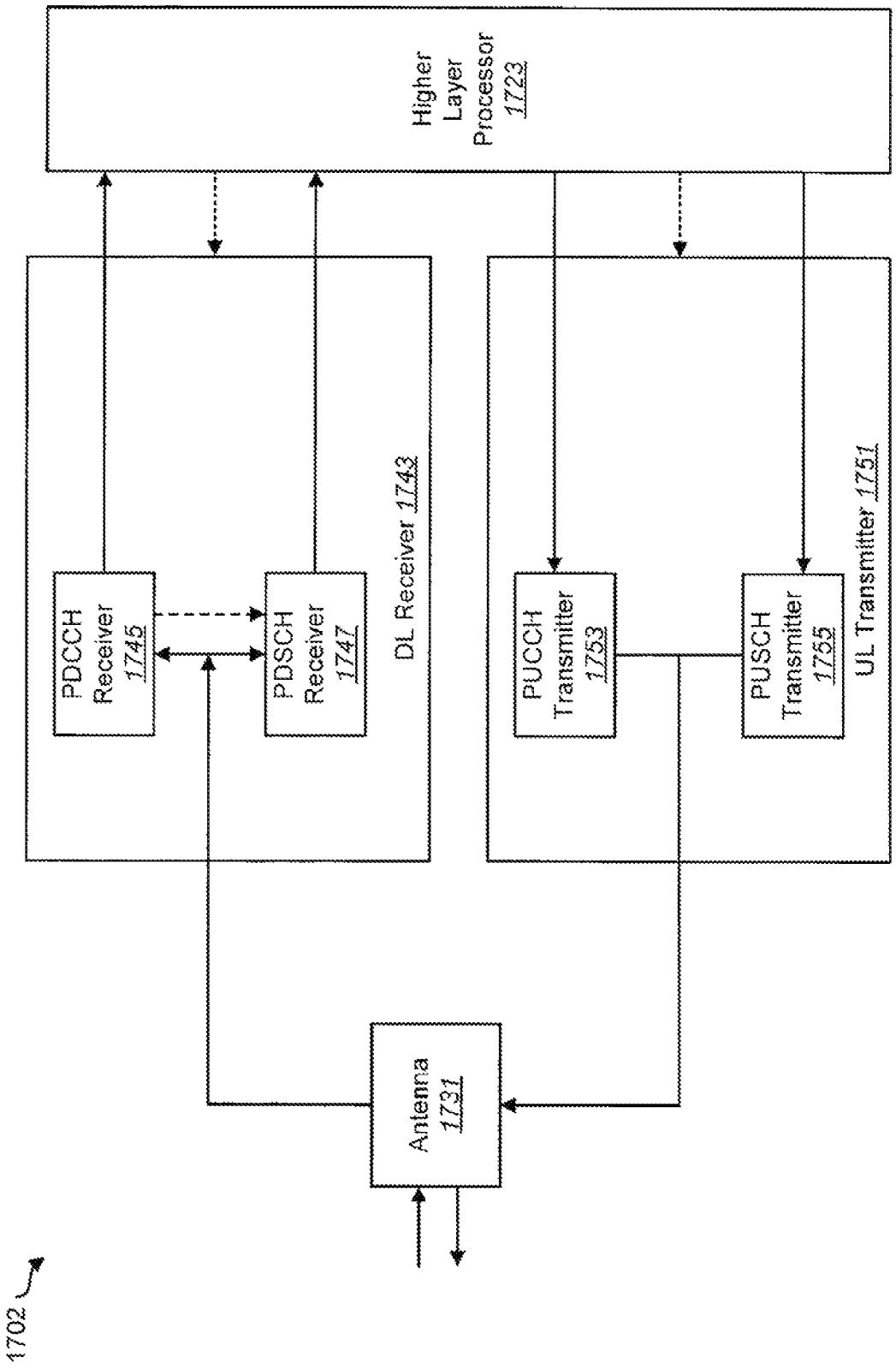
FIG. 17 is a block diagram illustrating one implementation of a UE.

FIG. 17 is a block diagram illustrating one implementation of a UE 1702. The UE 1702 may include a higher layer processor 1723, a UL transmitter 1751, a DL receiver 1743, and one or more antenna 1731. The UL transmitter 1751 may include a PUCCH transmitter 1753 and a PUSCH transmitter 1755. The DL receiver 1743 may include a PDCCH receiver 1745 and a PDSCH receiver 1747.

The higher layer processor 1723 may manage physical layer's behaviors (the UL transmitter's and the DL receiver's behaviors) and provide higher layer parameters to the physical layer. The higher layer processor 1723 may obtain transport blocks from the physical layer. The higher layer processor 1723 may send/acquire higher layer messages such as an RRC message and MAC message to/from a UE's higher layer. The higher layer processor 1723 may provide the PUSCH transmitter transport blocks and provide the PUCCH transmitter 1753 UCI.

The DL receiver 1743 may receive multiplexed downlink physical channels and downlink physical signals via receiving antennas 1731 and de-multiplex them. The PDCCH receiver 1745 may provide the higher layer processor 1723 DCI. The PDSCH receiver 1747 may provide the higher layer processor 1723 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 18:
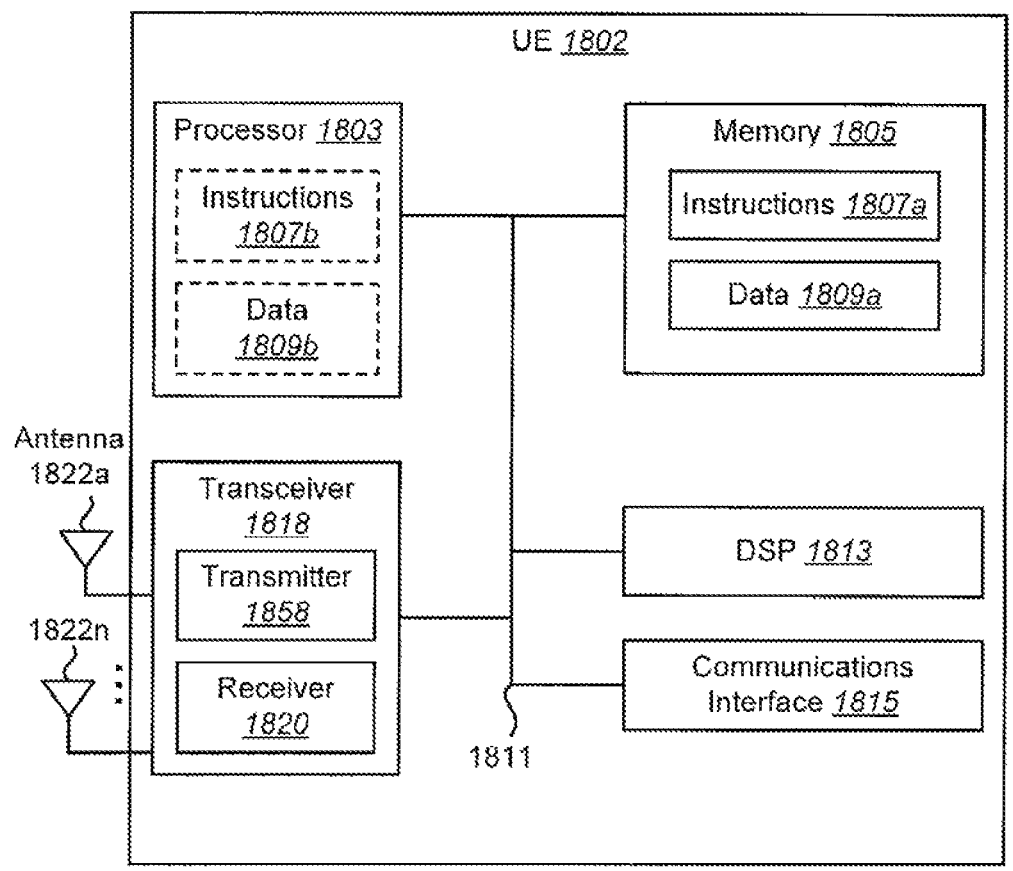
FIG. 18 illustrates various components that may be utilized in a UE.

FIG. 18 illustrates various components that may be utilized in a UE 1802. The UE 1802 described in connection with FIG. 18 may be implemented in accordance with the UE 102 described in connection with FIG. 1. The UE 1802 includes a processor 1803 that controls operation of the UE 1802. The processor 1803 may also be referred to as a central processing unit (CPU). Memory 1805, which may include read-only memory (ROM), random access memory (RAM), a combination of the two or any type of device that may store information, provides instructions 1807a and data 1809a to the processor 1803. A portion of the memory 1805 may also include non-volatile random-access memory (NVRAM). Instructions 1807b and data 1809b may also reside in the processor 1803. Instructions 1807b and/or data 1809b loaded into the processor 1803 may also include instructions 1807a and/or data 1809a from memory 1805 that were loaded for execution or processing by the processor 1803. The instructions 1807b may be executed by the processor 1803 to implement the methods described above.

The UE 1802 may also include a housing that contains one or more transmitters 1858 and one or more receivers 1820 to allow transmission and reception of data. The transmitter(s) 1858 and receiver(s) 1820 may be combined into one or more transceivers 1818. One or more antennas 1822a-n are attached to the housing and electrically coupled to the transceiver 1818.

The various components of the UE 1802 are coupled together by a bus system 1811, which may include a power bus, a control signal bus and a status signal bus, in addition to a data bus. However, for the sake of clarity, the various buses are illustrated in FIG. 18 as the bus system 1811. The UE 1802 may also include a digital signal processor (DSP) 1813 for use in processing signals. The UE 1802 may also include a communications interface 1815 that provides user access to the functions of the UE 1802. The UE 1802 illustrated in FIG. 18 is a functional block diagram rather than a listing of specific components.

Figure 19:
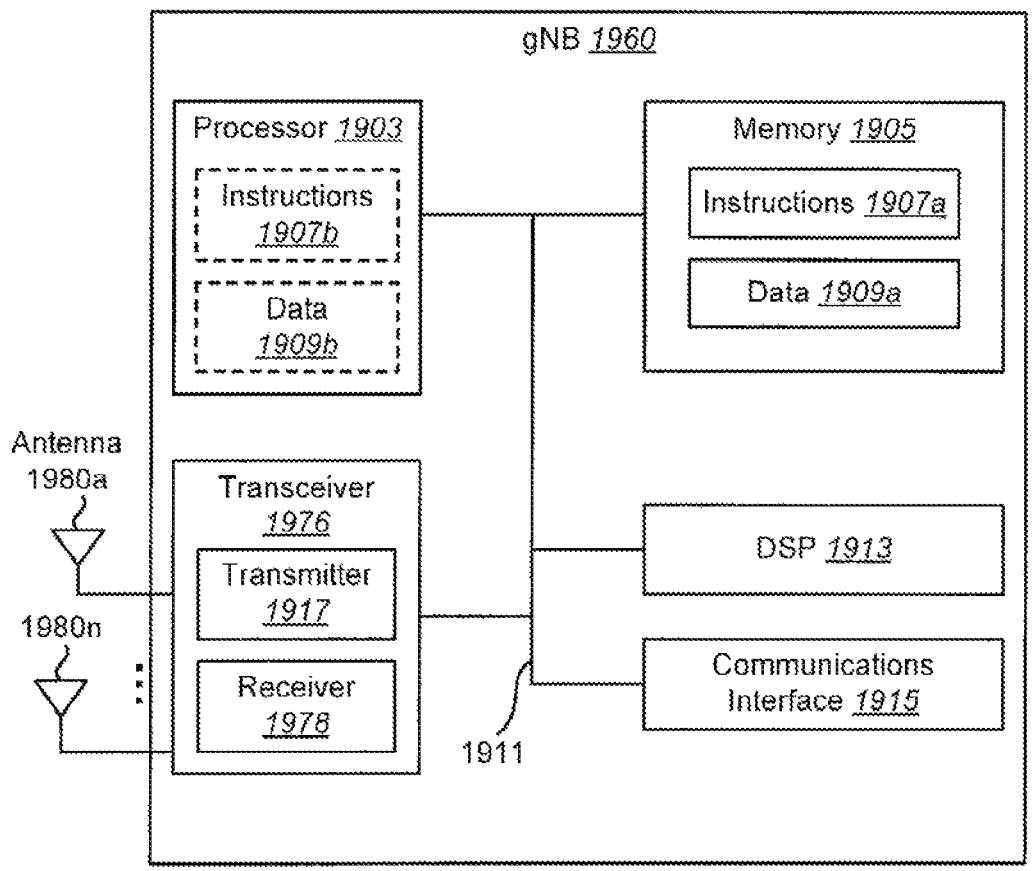
FIG. 19 illustrates various components that may be utilized in a gNB.

FIG. 19 illustrates various components that may be utilized in a gNB 1960. The gNB 1960 described in connection with FIG. 19 may be implemented in accordance with the gNB 160 described in connection with FIG. 1. The gNB 1960 includes a processor 1903 that controls operation of the gNB 1960. The processor 1903 may also be referred to as a central processing unit (CPU). Memory 1905, which may include read-only memory (ROM), random access memory (RAM), a combination of the two or any type of device that may store information, provides instructions 1907a and data 1909a to the processor 1903. A portion of the memory 1905 may also include non-volatile random-access memory (NVRAM). Instructions 1907b and data 1909b may also reside in the processor 1903. Instructions 1907b and/or data 1909b loaded into the processor 1903 may also include instructions 1907a and/or data 1909a from memory 1905 that were loaded for execution or processing by the processor 1903. The instructions 1907b may be executed by the processor 1903 to implement the methods described above.

The gNB 1960 may also include a housing that contains one or more transmitters 1917 and one or more receivers 1978 to allow transmission and reception of data. The transmitter(s) 1917 and receiver(s) 1978 may be combined into one or more transceivers 1976. One or more antennas 1980a-n are attached to the housing and electrically coupled to the transceiver 1976.

The various components of the gNB 1960 are coupled together by a bus system 1911, which may include a power bus, a control signal bus and a status signal bus, in addition to a data bus. However, for the sake of clarity, the various buses are illustrated in FIG. 19 as the bus system 1911. The gNB 1960 may also include a digital signal processor (DSP) 1913 for use in processing signals. The gNB 1960 may also include a communications interface 1915 that provides user access to the functions of the gNB 1960. The gNB 1960 illustrated in FIG. 19 is a functional block diagram rather than a listing of specific components.

Figure 20:
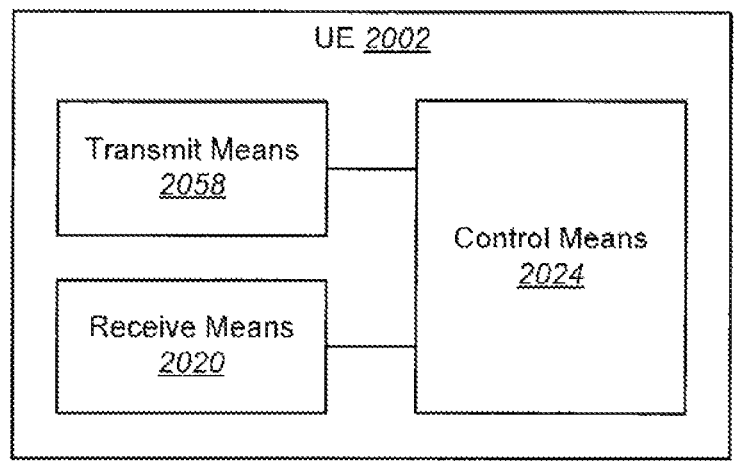
FIG. 20 is a block diagram illustrating one implementation of a UE in which systems and methods for HARQ-ACK timing and PUCCH resource determination for ultra-low latency PDSCH transmission may be implemented.

FIG. 20 is a block diagram illustrating one implementation of a UE 2002 in which systems and methods for HARQ-ACK timing and PUCCH resource determination for ultra-low latency PDSCH transmission may be implemented. The UE 2002 includes transmit means 2058, receive means 2020 and control means 2024. The transmit means 2058, receive means 2020 and control means 2024 may be configured to perform one or more of the functions described in connection with FIG. 1 above. FIG. 18 above illustrates one example of a concrete apparatus structure of FIG. 20. Other various structures may be implemented to realize one or more of the functions of FIG. 1. For example, a DSP may be realized by software.

Figure 21:
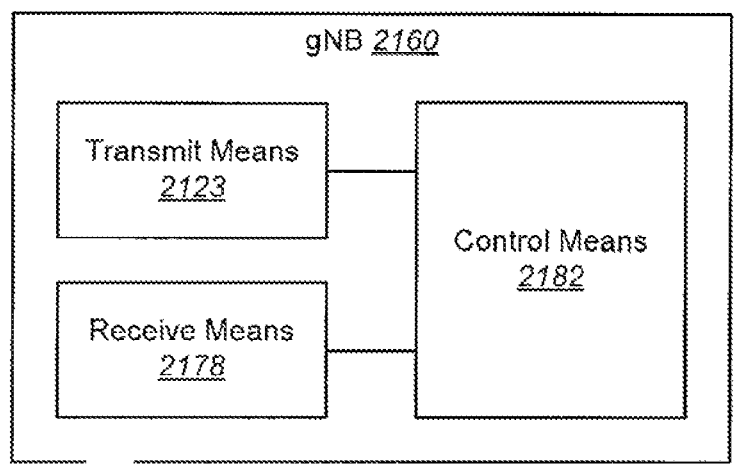
FIG. 21 is a block diagram illustrating one implementation of a gNB in which systems and methods for HARQ-ACK timing and PUCCH resource determination for ultra-low latency PDSCH transmission may be implemented.

FIG. 21 is a block diagram illustrating one implementation of a gNB 2160 in which systems and methods for HARQ-ACK timing and PUCCH resource determination for ultra-low latency PDSCH transmission may be implemented. The gNB 2160 includes transmit means 2123, receive means 2178 and control means 2182. The transmit means 2123, receive means 2178 and control means 2182 may be configured to perform one or more of the functions described in connection with FIG. 1 above. FIG. 19 above illustrates one example of a concrete apparatus structure of FIG. 21. Other various structures may be implemented to realize one or more of the functions of FIG. 1. For example, a DSP may be realized by software.

FIG. 22 illustrates an example of HARQ-ACK timing based on the subslot duration of a PUCCH configuration. Downlink (DL) 2201 and uplink (UL) 2203 subslots are shown. An URLLC PDSCH transmission 2205 occurs on the DL 2201. The PUCCH has a 2-symbol subslot structure.

If the last symbol of the PDSCH is within subslot n of the subslot structure for PUCCH allocation, the PDSCH-to-HARQ-timing indicator indicates a number of subslots K1, then the PUCCH resource in subslot n+K1 is used to feedback the HARQ-ACK of the corresponding PDSCH transmission 2205.

In this example, PDSCH ends in subslot n of the PUCCH subslot structure. PDSCH HARQ-ACK is reported on a PUCCH resource in subslot n+K1, where K1=2 in this example.

FIG. 23 illustrates an example of HARQ-ACK timing based on the subslot duration of a PDSCH transmission. Downlink (DL) 2301 and uplink (UL) 2303 subslots are shown. An URLLC PDSCH transmission 2305 occurs on the DL 2301. The PUCCH has a 2-symbol subslot structure. In one case, a DL subslot structure may be configured, and subslot level PDSCH is scheduled based on the DL subslot structure. The DL subslot structure may be the same or different from the UL subslot structure. In another case, no DL structure is configured, the subslot based PDSCH duration is determined based on the scheduling DCI in a dynamic manner.

In this example, it is assumed that the PDSCH has a duration of N symbols and K1 is indicated by the PDSCH-to-HARQ-timing indicator. In this example, K1=2.

The PUCCH resource is determined as an earliest subslot after K1*N symbols of the last symbol of the PDSCH transmission. In this example, PDSCH HARQ-ACK is reported on a PUCCH resource in a UL subslot that is at least K1*N symbols after the PDSCH transmission.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

The invention claimed is:

1. A user equipment (UE), comprising:
a higher layer processor configured to:
determine a hybrid automatic repeat request-acknowledgment (HARQ-ACK) feedback timing of a HARQ-ACK feedback for ultra-reliable low-latency communication (URLLC) physical downlink shared channel (PDSCH) transmissions based on a subslot structure; and
determine a physical uplink control channel (PUCCH) resource with a starting symbol index for the HARQ-ACK feedback; and
transmitting circuitry configured to transmit the HARQ-ACK feedback for the URLLC PDSCH transmissions based on the HARQ-ACK feedback timing and the PUCCH resource having the subslot structure, wherein:
a subslot duration and the subslot structure are determined based on an uplink subslot duration in a PUCCH configuration,
the starting symbol index is determined based on the subslot structure,
a PDSCH-to-HARQ-timing indicator indicates a number of subslots, and
the HARQ-ACK feedback is transmitted, after the number of subslots, starting from an end of the URLLC PDSCH transmissions.

2. The UE of claim 1, wherein the HARQ-ACK feedback timing is determined based on an explicit timing indication.

3. The UE of claim 1, wherein the HARQ-ACK feedback timing is further determined based on a pre-defined or configured HARQ-ACK timing table.

4. The UE of claim 3, wherein a timing in the HARQ-ACK timing table corresponds to modulation and coding scheme (MCS) settings or transport block (TB) sizes.

5. The UE of claim 3, wherein a timing in the HARQ-ACK timing table is determined based on a number of symbols in a PDSCH transmission or based on a PDSCH duration.

6. The UE of claim 3, wherein a timing in the HARQ-ACK timing table is determined based on a UE capability.

7. A base station (BS), comprising:
transmitting circuitry configured to:
transmit radio resource control (RRC) signaling to configure a hybrid automatic repeat request-acknowledgment (HARQ-ACK) feedback timing of a HARQ-ACK feedback for ultra-reliable low-latency communication (URLLC) physical downlink shared channel (PDSCH) transmissions, a subslot structure; and
determine a physical uplink control channel (PUCCH) resource with a starting symbol index for the HARQ-ACK feedback; and
receiving circuitry configured to receive the HARQ-ACK feedback for the URLLC PDSCH transmissions based on the HARQ-ACK feedback timing and the PUCCH resource having the subslot structure, wherein:
a subslot duration and the subslot structure are determined based on an uplink subslot duration in a PUCCH configuration,
the starting symbol index is determined based on the subslot structure,
a PDSCH-to-HARQ-timing indicator indicates a number of subslots, and the HARQ-ACK feedback is received, after the number of subslots, starting from an end of the URLLC PDSCH transmissions.

8. The BS of claim 7, wherein the HARQ-ACK feedback timing is determined based on an explicit timing indication.

9. The BS of claim 7, wherein the HARQ-ACK feedback timing is further determined based on a pre-defined or configured HARQ-ACK timing table.

10. The BS of claim 9, wherein a timing in the HARQ-ACK timing table corresponds to modulation and coding scheme (MCS) settings or transport block (TB) sizes.

11. The BS of claim 9, wherein a timing in the HARQ-ACK timing table is determined based on a number of symbols in a PDSCH transmission or based on a PDSCH duration.

12. The BS of claim 9, wherein a timing in the HARQ-ACK timing table is determined based on a UE capability.

13. A method performed by a user equipment (UE), the method comprising:
determining a hybrid automatic repeat request-acknowledgment (HARQ-ACK) feedback timing of a HARQ-ACK feedback for ultra-reliable low-latency communication (URLLC) physical downlink shared channel (PDSCH) transmissions based on a subslot structure;
determining a physical uplink control channel (PUCCH) resource with a starting symbol index for the HARQ-ACK feedback; and
transmitting the HARQ-ACK feedback for the URLLC PDSCH transmissions based on the HARQ-ACK feedback timing and the PUCCH resource having the subslot structure, wherein:
a subslot duration and the subslot structure are determined based on an uplink subslot duration in a PUCCH configuration,
the starting symbol index is determined based on the subslot structure,
a PDSCH-to-HARQ-timing indicator indicates a number of subslots, and the HARQ-ACK feedback is transmitted, after the number of subslots, starting from an end of the URLLC PDSCH transmissions.

\* \* \* \* \*